US009149715B2

United States Patent
Abe et al.

(10) Patent No.: US 9,149,715 B2
(45) Date of Patent: Oct. 6, 2015

(54) GAME SYSTEM, GAME APPARATUS, STORAGE MEDIUM HAVING GAME PROGRAM STORED THEREIN, AND IMAGE GENERATION METHOD

(75) Inventors: Goro Abe, Kyoto (JP); Yasuhito Fujisawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 411 days.

(21) Appl. No.: 13/367,808

(22) Filed: Feb. 7, 2012

(65) Prior Publication Data
US 2012/0264512 A1  Oct. 18, 2012

(30) Foreign Application Priority Data

Apr. 11, 2011 (JP) .................................. 2011-087199

(51) Int. Cl.
| | |
|---|---|
| *G06T 15/00* | (2011.01) |
| *A63F 9/24* | (2006.01) |
| *A63F 13/00* | (2014.01) |
| *G06F 17/00* | (2006.01) |
| *G06F 19/00* | (2011.01) |
| *A63F 13/20* | (2014.01) |
| *A63F 13/40* | (2014.01) |

(52) U.S. Cl.
CPC .................. *A63F 13/06* (2013.01); *A63F 13/10* (2013.01); *A63F 2300/204* (2013.01); *A63F 2300/301* (2013.01); *A63F 2300/405* (2013.01); *A63F 2300/66* (2013.01)

(58) Field of Classification Search
CPC ... A63F 13/06; A63F 13/10; A63F 2300/204; A63F 2300/301; A63F 2300/405; A63F 2300/66
See application file for complete search history.

(56) References Cited

U.S. PATENT DOCUMENTS

| | | | |
|---|---|---|---|
| 4,710,873 | A | 12/1987 | Breslow et al. |
| 6,435,969 | B1 | 8/2002 | Tanaka et al. |
| 6,821,204 | B2 | 11/2004 | Aonuma et al. |
| 6,894,686 | B2 | 5/2005 | Stamper et al. |

(Continued)

FOREIGN PATENT DOCUMENTS

| | | |
|---|---|---|
| JP | 2007-300562 | 11/2007 |
| JP | 2009-536058 | 10/2009 |

(Continued)

OTHER PUBLICATIONS

Office Action issued in U.S. Appl. No. 13/368,826 dated Jun. 24, 2013.

(Continued)

*Primary Examiner* — Kee M Tung
*Assistant Examiner* — Frank Chen
(74) *Attorney, Agent, or Firm* — Nixon & Vanderhye P.C.

(57) ABSTRACT

An example game system includes a game apparatus and a terminal device capable of communicating with the game apparatus. The terminal device transmits a pickup image obtained by an image pickup section to the game apparatus. The game apparatus receives the pickup image, and generates a first image by synthesizing the pickup image at least in part with an image of a predetermined virtual space as viewed from a first virtual camera. The first image is outputted and displayed on a predetermined display device. In addition, the game apparatus generates a second image of the virtual space as viewed from a second virtual camera different from the first virtual camera. The second image is outputted and displayed on the terminal device.

29 Claims, 16 Drawing Sheets

(56) References Cited

U.S. PATENT DOCUMENTS

| | | |
|---|---|---|
| 6,921,336 B1 | 7/2005 | Best |
| 6,966,837 B1 | 11/2005 | Best |
| 6,994,626 B1 | 2/2006 | D'Achard Van Enschut |
| 7,115,031 B2 | 10/2006 | Miyamoto et al. |
| 8,253,649 B2 * | 8/2012 | Imai et al. ............ 345/1.3 |
| 8,339,418 B1 * | 12/2012 | Nesmith ............ 345/633 |
| 8,363,157 B1 * | 1/2013 | Han ............ 348/371 |
| 8,419,537 B2 | 4/2013 | Miyamoto et al. |
| 8,747,222 B2 | 6/2014 | Yamashita |
| 2002/0165028 A1 | 11/2002 | Miyamoto et al. |
| 2003/0100363 A1 | 5/2003 | Ali |
| 2003/0216177 A1 | 11/2003 | Aonuma et al. |
| 2003/0220145 A1 | 11/2003 | Erickson et al. |
| 2004/0023719 A1 | 2/2004 | Hussaini et al. |
| 2004/0266529 A1 | 12/2004 | Chatani |
| 2005/0007384 A1 | 1/2005 | Yamada et al. |
| 2005/0078125 A1 | 4/2005 | Yamada et al. |
| 2006/0223635 A1 | 10/2006 | Rosenberg |
| 2006/0267928 A1 | 11/2006 | Kawanobe et al. |
| 2007/0296820 A1 * | 12/2007 | Lonn ............ 348/207.99 |
| 2008/0200247 A1 | 8/2008 | Yoshizawa |
| 2010/0160050 A1 | 6/2010 | Oku |
| 2010/0255910 A1 | 10/2010 | Miyamoto et al. |
| 2011/0159957 A1 | 6/2011 | Kawaguchi et al. |
| 2011/0190061 A1 | 8/2011 | Takeda et al. |
| 2012/0046101 A1 * | 2/2012 | Marks et al. ............ 463/30 |
| 2012/0190448 A1 * | 7/2012 | Larsen et al. ............ 463/36 |
| 2012/0201424 A1 * | 8/2012 | Masalkar et al. ............ 382/106 |
| 2012/0274585 A1 * | 11/2012 | Telfer et al. ............ 345/173 |
| 2012/0309512 A1 | 12/2012 | Abe |
| 2012/0309513 A1 | 12/2012 | Abe |
| 2012/0309542 A1 | 12/2012 | Nogami et al. |
| 2013/0090165 A1 | 4/2013 | Shikata et al. |

FOREIGN PATENT DOCUMENTS

| | | |
|---|---|---|
| JP | 2010-142592 | 7/2010 |
| WO | WO 2007/128949 | 11/2007 |
| WO | WO 2007/128949 A1 | 11/2007 |

OTHER PUBLICATIONS

Office Action issued in U.S. App. No. 13/368,826 dated Dec. 17, 2013.

Notice of Allowance issued in U.S. Appl. No. 13/368,826 dated Apr. 11, 2014.

* cited by examiner

GAME SYSTEM, GAME APPARATUS, STORAGE MEDIUM HAVING GAME PROGRAM STORED THEREIN, AND IMAGE GENERATION METHOD

CROSS REFERENCE TO RELATED APPLICATION

The disclosure of Japanese Patent Application No. 2011-087199, filed Apr. 11, 2011, is incorporated herein by reference.

FIELD

Disclosed herein are game systems, game apparatuses, storage media having game programs stored therein, and image generation methods, which are intended to use pickup images obtained by cameras or suchlike in games, for example.

BACKGROUND AND SUMMARY

There is a conventional technology in which pickup images obtained by a camera or suchlike are used in a game. For example, a game apparatus provided with a camera can use a pickup image obtained by a camera as a portion of a game image. In the game apparatus, for example, the camera picks up an image of the game player's face, and then uses the pickup image in game processing as a game input, or displays the pickup image after the game. Accordingly, the player can use the pickup image in a game operation or, following the game, enjoy viewing the expression on the face captured during the game.

While conventionally, pickup images are used as game images, the real space as represented by the pickup images is not displayed in good association with a virtual space constructed by the game apparatus. For example, while conventionally, pickup images are displayed with objects or suchlike synthesized thereon, it is not possible to allow the player to have a feeling as if the virtual space displayed on the screen actually existed in depth beyond the screen, and therefore, in some cases, the virtual space might not appear sufficiently real.

Therefore, the game systems, game apparatuses, storage media having game programs stored therein, and image generation methods as disclosed herein are intended to allow a virtual space displayed on the screen to appear more real.

(1) An example game system described herein includes a game apparatus and a terminal device capable of communicating with the game apparatus.

The terminal device includes an image pickup unit, a transmission unit, and a display unit. The transmission unit transmits a pickup image obtained by the image pickup unit to the game apparatus. The display unit displays an image outputted by the game apparatus.

The game apparatus includes a reception unit, a first image generation unit, a first image output unit, a second image generation unit, and a second image output unit. The reception unit receives the pickup image. The first image generation unit generates a first image by synthesizing the pickup image at least in part with an image of a predetermined virtual space as viewed from a first virtual camera. The first image output unit outputs the first image to a predetermined display device. The second image generation unit generates a second image of the virtual space as viewed from a second virtual camera different from the first virtual camera. The second image output unit outputs the second image to the terminal device.

The "game apparatus" may be any apparatus capable of performing the processing of each of the aforementioned units. For example, the game apparatus may be an information processing apparatus exclusively intended for game use or may be a multipurpose information processing apparatus such as a general personal computer.

The "terminal device" is a device including an image pickup unit and a display unit and being capable of communicating with the game apparatus, and may have the function of an operating device as does a terminal device 7 in an example embodiment to be described later.

The "game system" includes an operating device and an information processing apparatus, and may or may not include the "predetermined display device" for displaying the first image. That is, the game system may or may not be provided in a form including the predetermined display device.

The "first image" may be generated arbitrarily so long as it includes an image representing a virtual space and at least a part of a pickup image. The "first image" may be perceived as if the real space represented by the pickup image were connected to the virtual space, e.g., the first image has the pickup image (at least in part) arranged in the virtual space. Here, the "image having the pickup image arranged in the virtual space" may be generated arbitrarily so long as the pickup image appears to exist in the virtual space. The "first image" may or may not have a virtual space object displayed on (or in front of) the pickup image.

The "second image" represents the virtual space as viewed from the second virtual camera different from the first virtual camera. That is, the "second image" represents the virtual space viewed from a different viewpoint from the first image.

According to the above configuration (1), the first image to be displayed on the predetermined display device is an image obtained by synthesizing an image of the virtual space and a pickup image, and therefore, the first image represents the real space as viewed from the virtual space. On the other hand, the second image to be displayed on the terminal device is an image of the virtual space viewed from a different viewpoint from the first image, and therefore, the second image represents the virtual space as viewed from the real space. As a result, the predetermined display device displays an image of the real space as viewed from the virtual space, and the terminal device displays an image of the virtual space as viewed from the real space. Thus, by viewing these two images, the player holding the terminal device can feel as if the virtual space were connected to the real space and actually existed. The player can clearly feel as if the virtual space spread beyond the screen of the terminal device, and can perceive the virtual space to be more real. Thus, according to the above configuration (1), the terminal device displays a virtual space, and the predetermined display device displays an image obtained by synthesizing a pickup image with an image representing the virtual space, so the virtual space can appear more real.

(2) The game apparatus may further include a virtual camera setting unit. The virtual camera setting unit sets the first virtual camera and the second virtual camera such that the first and second virtual cameras are directed from opposite sides toward a predetermined plane within the virtual space.

The "predetermined plane" is a concept used for specifying the positional relationship between two virtual cameras, and the actual game processing does not include arranging an object corresponding to the predetermined plane or calculating the position and/or the attitude of the predetermined plane. That is, the virtual camera setting unit sets two virtual cameras, and may or may not perform the processing for arranging the predetermined plane.

According to the above configuration (2), the second image is an image of the virtual space representing the predetermined plane as viewed from one side, and the first image is an image of the virtual space representing the predetermined plane as viewed from the other side and including a pickup image within the virtual space. In this case, the line-of-sight direction in the second image is from the front side of the screen of the terminal device to the rear, and is the same as the player's line-of-sight direction. On the other hand, with reference to the virtual space displayed on the terminal device, the line-of-sight direction in the first image is from the rear side of the terminal device's screen toward the front, and is approximately opposite to the player's line-of-sight direction. That is, the first image is provided as an image as viewed from the rear side of the terminal device's screen toward the player. Thus, according to the above configuration (2), the terminal device displays an image with the line-of-sight direction from the front of the terminal device's screen toward the rear, and the predetermined display device displays an image with the line-of-sight direction from the rear of the screen toward the front, so the virtual space represented by each image can appear more real.

(3) The first image generation unit may generate a first image with the pickup image being displayed at least in part at a position of the predetermined plane.

According to the above configuration (3), the pickup image is displayed at the position of the predetermined plane, and therefore, the player has a perception as if the virtual space existed on the side of the first virtual camera with respect to the predetermined plane, and as if the real space were on the side of the second virtual camera. Thus, the player can feel as if the virtual space were connected to the real space via the predetermined plane, so the virtual space can appear more real.

(4) The game apparatus may further include a plane arrangement unit for arranging a rendering plane within the virtual space, the plane having at least a part of the pickup image rendered thereon. In this case, the first image generation unit generates a first image which represents the virtual space including the rendering plane.

The "rendering plane" is an arbitrary plane within the virtual space, and may have any arbitrary shape, e.g., a curved shape, or a rectangular plane as in the example embodiment to be described later. Moreover, the pickup image may be rendered on the whole or part of the rendering plane.

The above configuration (4) makes it possible to readily generate a first image which can appear as if (at least a part of) the pickup image existed in the virtual space.

(5) The game apparatus may further include a first camera setting unit for setting a position and an attitude of the first virtual camera such that the rendering plane is viewed from a side on which the pickup image is rendered.

According to the above configuration (5), the first virtual camera has the virtual space including the rendering plane placed within its field-of-view range, making it possible to readily generate a first image by synthesizing an image of the virtual space with a pickup image. Moreover, the first image can be viewed as if the virtual space were connected to the real space represented by the pickup image, so the virtual space can appear more real.

(6) The game apparatus may further include a second camera setting unit for setting a position and an attitude of the second virtual camera such that the rendering plane is viewed from an opposite side to a side on which the pickup image is rendered.

The above configuration (6) makes it possible to readily generate a second image of the virtual space not including a pickup image. Particularly, in the case where the above configuration (6) is used in combination with the above configuration (5), the first and second virtual cameras are set so as to face approximately opposite directions with respect to the rendering plane in the virtual space. Thus, as in the above configuration (2), the terminal device displays an image with the line-of-sight direction from the front of the screen toward the rear, and the predetermined display device displays an image with the line-of-sight direction from the rear of the screen toward the front, so the virtual space represented by each image can appear more real.

(7) The game system may further include a game processing unit for executing predetermined game processing on the basis of an action of a predetermined object arranged in the virtual space and the pickup image rendered on the rendering plane.

According to the above configuration (7), when the predetermined object takes some action toward the pickup image, the player can perceive the object in the virtual space affecting the real space represented by the pickup image. Thus, the player can strongly feel as if the virtual space were connected to the real space, so the virtual space can appear more real.

(8) The game system may further include an operating device capable of communicating with the game apparatus. In this case, the game processing unit controls the action of the predetermined object in accordance with an operation on the operating device.

The above configuration (8) allows a player different from the player holding the terminal device to play the game using the operating device. By manipulating the predetermined object using the operating device, the player can perceive the object in the virtual space affecting the real space represented by the pickup image.

(9) The game apparatus may further include a recognition processing unit and a game control processing unit. The recognition processing unit performs image recognition processing on the pickup image. The game control processing unit performs game control processing to add a change to the virtual space on the basis of the result for the image recognition processing.

According to the above configuration (9), the virtual space is changed on the basis of the result for the image recognition processing performed on the pickup image. Accordingly, the player can perform a game operation by changing the content of a pickup image to be obtained by the image pickup unit. For example, the player can perform a game operation by changing the expression on the face or by changing the position of the face. Here, the pickup image is displayed on the predetermined display device, along with an image of the virtual space, and therefore, the player's game operation is reflected in the virtual space displayed on the predetermined display device. That is, the above configuration (9) allows the player's action in the real space to be reflected in the displayed image, thereby changing the virtual space in accordance with the player's action, so the virtual space can appear more real.

(10) The terminal device may further include a microphone. In this case, the transmission unit transmits data for sound detected by the microphone to the game apparatus. Moreover, the game apparatus further includes a game control processing unit for performing game control processing to add a change to the virtual space on the basis of the sound data.

According to the above configuration (10), the virtual space is changed on the basis of sound detected by the microphone. Thus, the player can perform a game operation by providing an input to the microphone.

(11) The transmission unit may transmit operation data representing a player's operation on the terminal device to the game apparatus. In this case, the game apparatus further includes a game control processing unit for performing game control processing to add a change to the virtual space on the basis of the operation data.

The above configuration (11) allows the player to readily perform a game operation while holding the terminal device.

(12) The terminal device may further include a sensor unit for outputting motion data representing information about motion of the terminal device. In this case, the transmission unit transmits operation data including the motion data to the game apparatus.

The above configuration (12) allows the player to perform a game operation by moving the terminal device, making it possible to play the game with intuitive and easy operation.

(13) The terminal device may further include a position detection unit capable of detecting an input position on a screen of the display unit. In this case, the transmission unit transmits operation data including data for the position detected by the position detection unit to the game apparatus.

The above configuration (13) allows a game operation to be performed by directly touching the virtual space displayed on the screen of the terminal device, making it possible to play the game with intuitive and easy operation.

(14) The terminal device may further include at least one operation member. In this case, the transmission unit transmits operation data representing the player's operation on the operation member to the game apparatus.

The above configuration (14) allows the player to readily perform a game operation while holding the terminal device.

Note that disclosed herein are examples of the game apparatus included in the game system and the storage medium having stored therein a game program for causing a computer to function as means equivalent to the aforementioned units of the game apparatus (excluding the reception unit and the image output units). Also disclosed herein is an example of the image generation method to be executed in the game system or apparatus. Further disclosed herein are examples of the information processing system, apparatus, and program intended for purposes including, but not limited to, game use, and the image generation method to be executed by the information processing system or apparatus.

In the game system, game apparatus, game program, and image generation method as mentioned above, the predetermined display device displays a first image obtained by synthesizing an image of the virtual space as viewed from the first virtual camera with at least a part of a pickup image obtained by the terminal device, and the terminal device displays a second image of the virtual space as viewed from the second virtual camera different from the first virtual camera. Thus, the player can feel as if the virtual space were connected to the real space represented by the pickup image, so the virtual space can appear more real.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Overall Configuration of the Game System]

Figure 1:
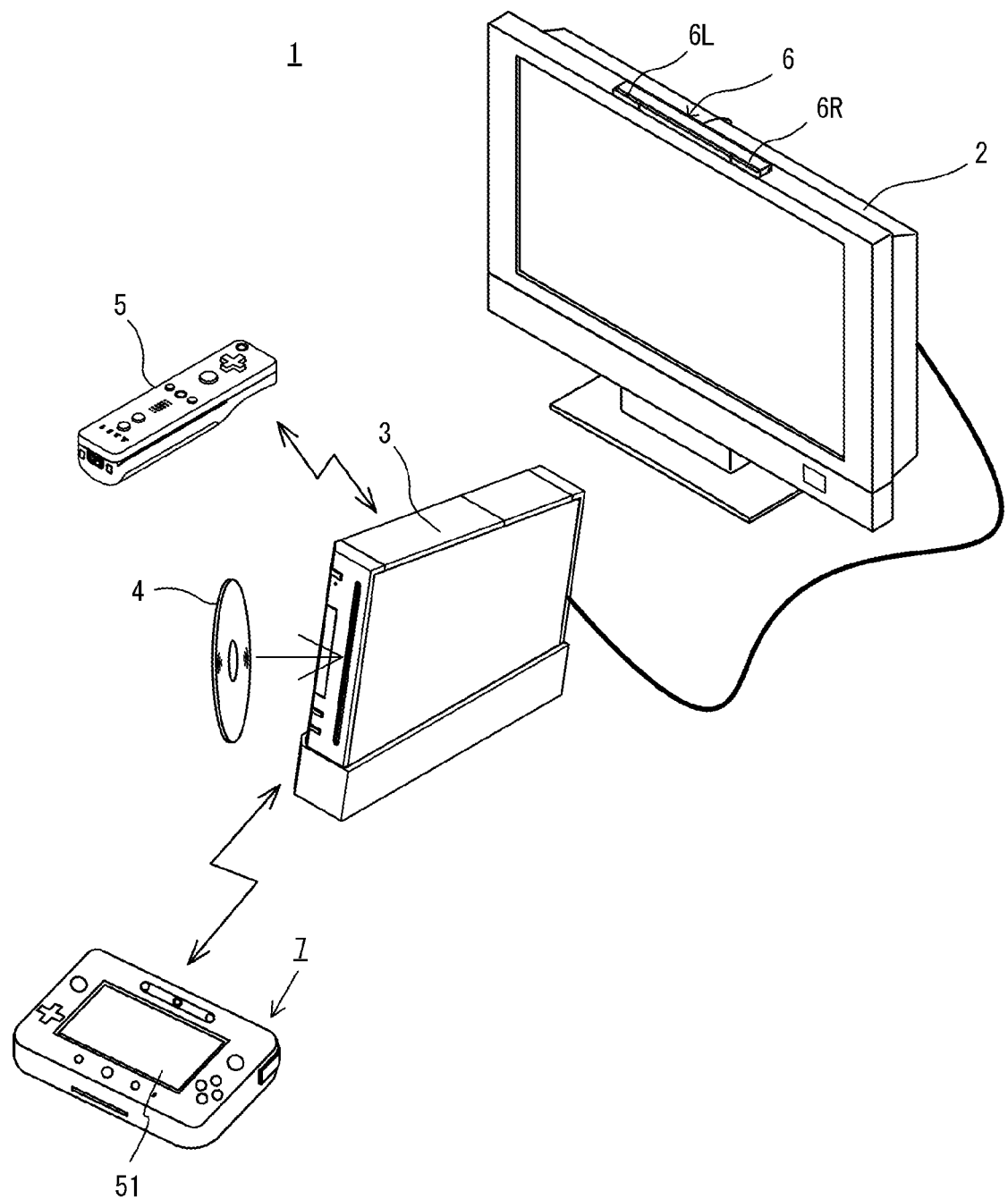
FIG. 1 is an external view of an example non-limiting game system.

An example game system 1 according to an example embodiment will now be described with reference to the drawings. FIG. 1 is an external view of the game system 1. In FIG. 1, the game system 1 includes a stationary display device (hereinafter referred to as a "television") 2 such as a television receiver, a stationary game apparatus 3, an optical disc 4, a controller 5, a marker device 6, and a terminal device 7. In the game system 1, the game apparatus 3 performs game processes based on game operations performed using the controller 5 and/or the terminal device 7, and game images acquired through the game processes are displayed on the television 2 and/or the terminal device 7.

In the game apparatus 3, the optical disc 4 typifying an information storage medium used for the game apparatus 3 in a replaceable manner is removably inserted. An information processing program (a game program, for example) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes a speaker 2a (see FIG. 2), and the speaker 2a outputs game sounds acquired as a result of the game process. In alternative example embodiments, the game apparatus 3 and the stationary display device may be an integral section. Also, the communication between the game apparatus 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game apparatus 3 for calculating the position, attitude, etc., of the controller 5. The marker device 6 includes two markers 6R and 6L on opposite ends thereof. Specifically, the marker 6R (as well as the marker 6L) includes one or more infrared LEDs (Light Emitting Diodes), and emits an infrared light in a forward direction from the television 2. The marker device 6 is connected to the game apparatus 3, and the game apparatus 3 is able to control the lighting of each infrared LED of the marker device 6. Note that the marker device 6 is of a transportable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game apparatus 3 with operation data representing the content of operations performed on the controller itself. The controller 5 and the game apparatus 3 can wirelessly communicate with each other. In the present example embodiment, the wireless communication between the controller 5 and the game apparatus 3 uses, for example, Bluetooth (Registered Trademark) technology. In other example embodiments, the controller 5 and the game apparatus 3 may be connected by a wired connection. Furthermore, in the present example embodiment, the game system 1 includes only one controller 5, but the game apparatus 3 is capable of communicating with a plurality of controllers, so that by using a predetermined number of controllers at the same time, a plurality of people can play the game. The configuration of the controller 5 will be described in detail later.

The terminal device 7 is a portable device of a size that can be held by the user, so that the user can hold and move the terminal device 7 or can place the terminal device 7 in any desired position. As will be described in detail later, the terminal device 7 includes a liquid crystal display (LCD) 51, and input means (e.g., a touch panel 52 and a gyroscope 64 to be described later). The terminal device 7 can communicate with the game apparatus 3 wirelessly (or wired). The terminal device 7 receives data for images generated by the game apparatus 3 (e.g., game images) from the game apparatus 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the content of operations performed thereon to the game apparatus 3.

[2. Internal Configuration of the Game Apparatus 3]

Figure 2:
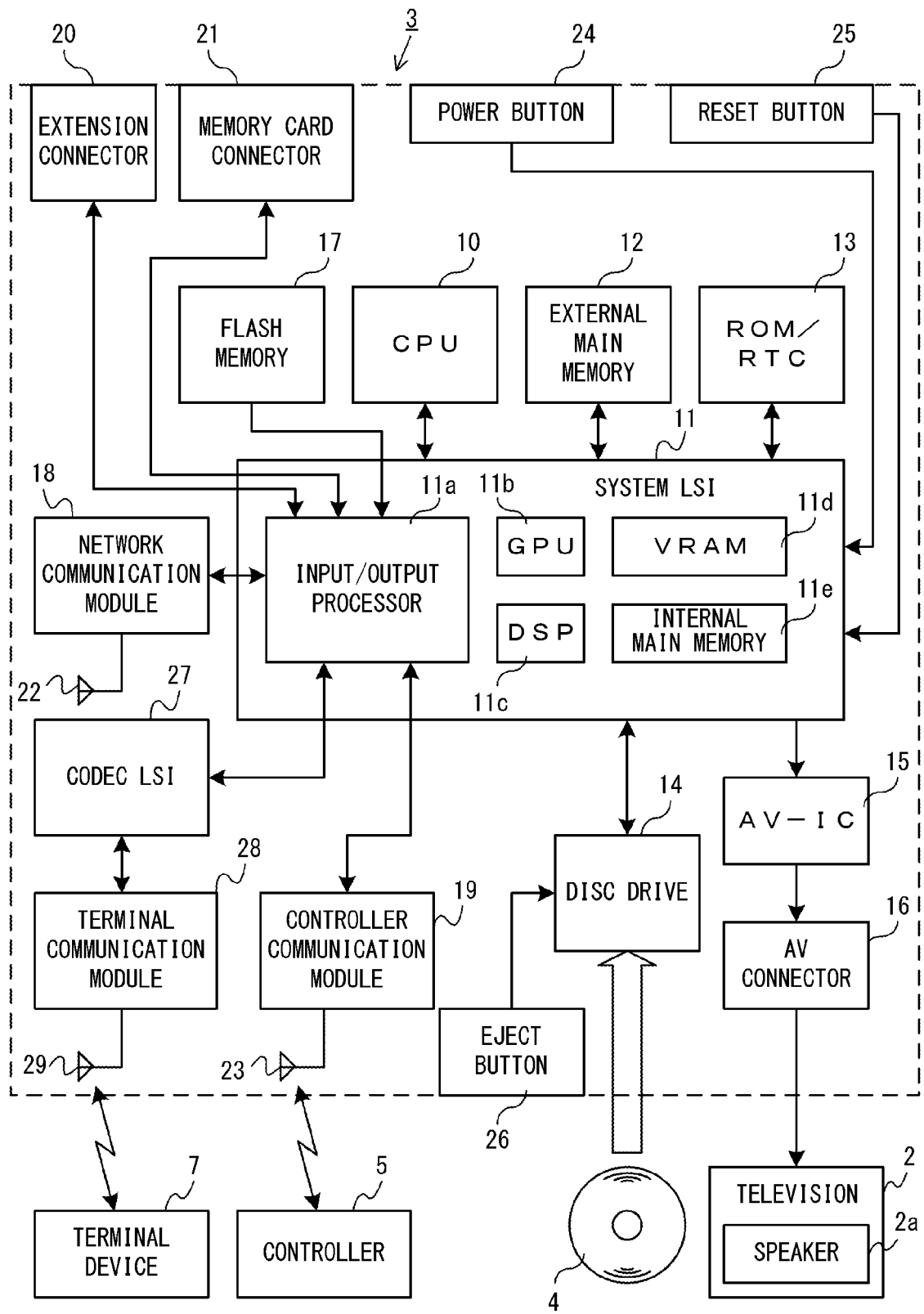
FIG. 2 is a block diagram illustrating an internal configuration of an example non-limiting game apparatus.

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device (s), and the like. The internal configuration of the system LSI 11 will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU 11b to execute the graphics commands. When images are generated, the GPU 11b generates image data using data stored in the VRAM 11d. Note that the game apparatus 3 generates both images to be displayed on the television 2 and images to be displayed on the terminal device 7. Hereinafter, the images to be displayed on the television 2 are referred to as the "television images" and the images to be displayed on the terminal device 7 are referred to as the "terminal images".

The DSP 11c, functioning as an audio processor, generates sound data using sound data and sound waveform (e.g., tone quality) data stored in one or both of the internal main memory 11e and the external main memory 12. Note that in the present example embodiment, game sounds to be generated are classified into two types as in the case of the game images, one being outputted from the speaker of the television 2, the other being outputted from speakers of the terminal device 7. Hereinafter, in some cases, the sounds to be outputted from the television 2 are referred to as "television sounds", and the sounds to be outputted from the terminal device 7 are referred to as "terminal sounds".

Among the images and sounds generated by the game apparatus 3 as described above, both image data and sound data to be outputted from the television 2 are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a. Note that the game apparatus 3 and the television 2 may be connected in any manner, and a control command for controlling the television 2 may be transmitted to the television 2 by the game apparatus 3 in a wired or wireless manner. For example, an HDMI cable, which supports the HDMI (high-definition multimedia interface) standard, may be used. The HDMI standard allows a device to control another device connected thereto on the basis of a function called CEC (consumer electronics control). Accordingly, in the case where the HDMI cable is used so that the game apparatus 3 can control the television 2, the game apparatus 3 can turn on the television 2 or switch between inputs to the television 2 at appropriate times.

Furthermore, among the images and sounds generated by the game apparatus 3, both image data and sound data to be outputted by the terminal device 7 are transmitted to the terminal device 7 by the input/output processor 11a, etc. The data transmission to the terminal device 7 by the input/output processor 11a, etc., will be described later.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game apparatus 3 is capable of connecting to a network such as the Internet to communicate with an external information processing apparatus (e.g., another game apparatus or a server). Specifically, the input/output processor 11a can be connected to a network such as the Internet via the network communication module 18 and the antenna 22 to communicate with external information processing apparatuses connected to the network. The input/output processor 11a regularly accesses the flash memory 17, and detects the presence or absence of any data to be transmitted to the network, and when detected, transmits the data to the network via the network communication module 18 and the antenna 22. Further, the input/output processor 11a receives data transmitted from the external information processing apparatuses and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and the external information processing apparatuses. Moreover, the flash memory 17 may have a game program stored therein.

Furthermore, the game apparatus 3 is capable of receiving operation data from the controller 5. Specifically, the input/output processor 11a receives operation data transmitted from the controller 5 via the antenna 23 and the controller communication module 19, and stores it (temporarily) in a buffer area of the internal main memory 11e or the external main memory 12.

Furthermore, the game apparatus 3 is capable of exchanging data, for images, sound, etc., with the terminal device 7. When transmitting game images (terminal game images) to the terminal device 7, the input/output processor 11a outputs game image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game apparatus 3 to the terminal device 7 is image data used in a game, and the playability of a game can be adversely influenced if there is a delay in the images displayed in the game. Therefore, the game system avoids delay in transmitting image data from the game apparatus 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game apparatus 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. Any method can be employed for compressing the sound data, and such a method uses a high compression rate but causes less sound degradation. Also, in another example embodiment, the sound data may be transmitted without compression. The terminal communication module 28 transmits compressed image and sound data to the terminal device 7 via the antenna 29.

Furthermore, in addition to the image and sound data, the game apparatus 3 transmits various control data to the terminal device 7 where appropriate. The control data is data representing an instruction to control a component included in the terminal device 7, e.g., an instruction to control lighting of a marker section (a marker section 55 shown in FIG. 10) or an instruction to control shooting by a camera (a camera 56 shown in FIG. 10). The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game apparatus 3 to the terminal device 7 may or may not be coded depending on the situation.

Furthermore, the game apparatus 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game apparatus 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the game apparatus 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied from an external power source to the components of the game apparatus 3 via an AC adaptor (not shown). When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

In other example embodiments, some of the components of the game apparatus 3 may be provided as extension devices separate from the game apparatus 3. In this case, an extension device may be connected to the game apparatus 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game apparatus which does not include the above components, the game apparatus can communicate with the terminal device 7.

[3. Configuration of the Controller 5]

Figure 3:
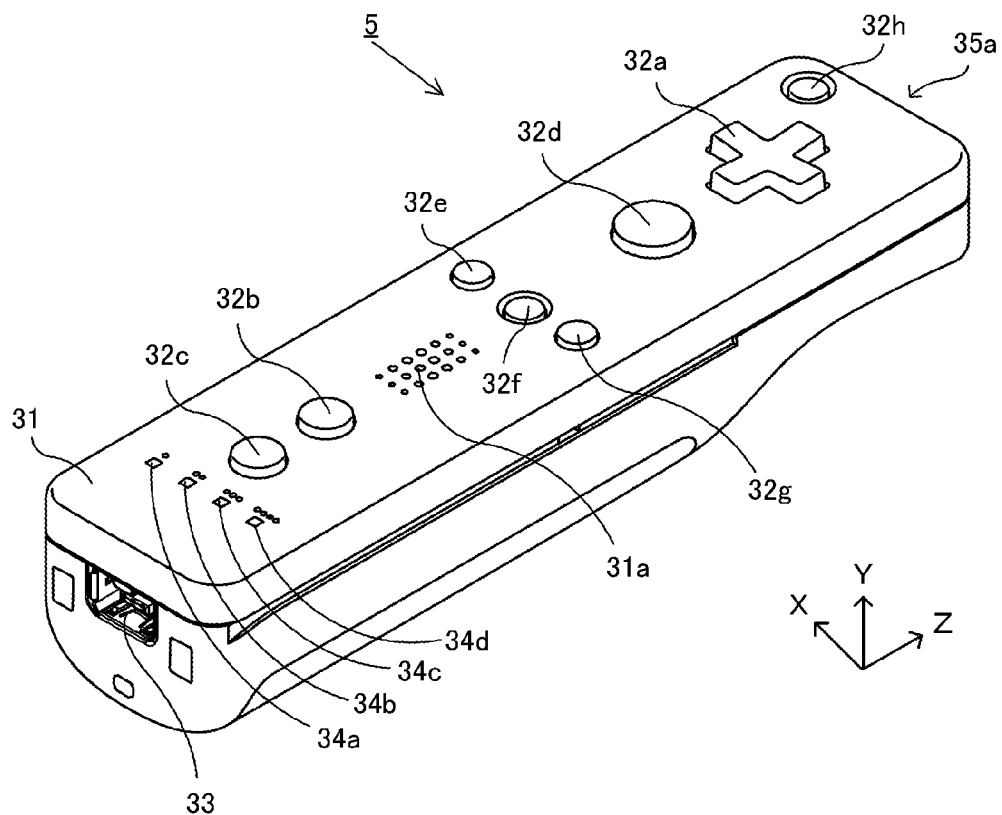
FIG. 3 is a perspective view illustrating an example non-limiting controller as viewed from above on the rear side.
Figure 4:
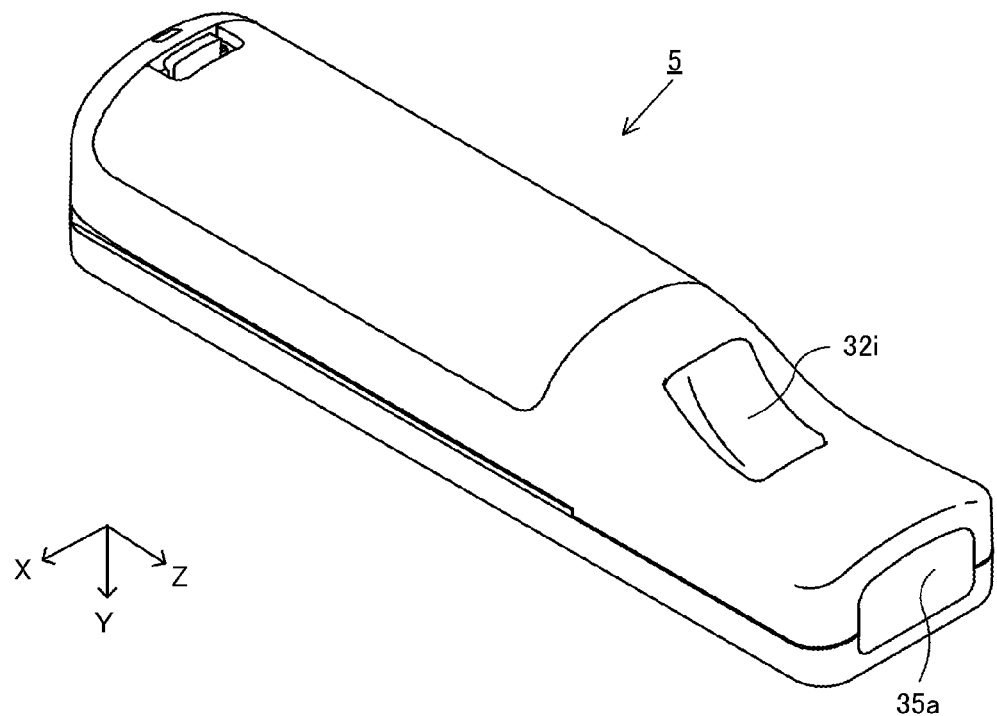
FIG. 4 is a perspective view illustrating the controller as viewed from below on the front side.

Next, with reference to FIGS. 3 to 7, the controller 5 will be described. FIGS. 3 and 4 are perspective views each illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the controller 5, and moving the controller 5 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting the controller 5 to another device (e.g., another sensor section or controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 47 (shown in FIG. 5) incorporated in the controller 5 is provided between the first button 32b and the home button 32f.

Figure 5:
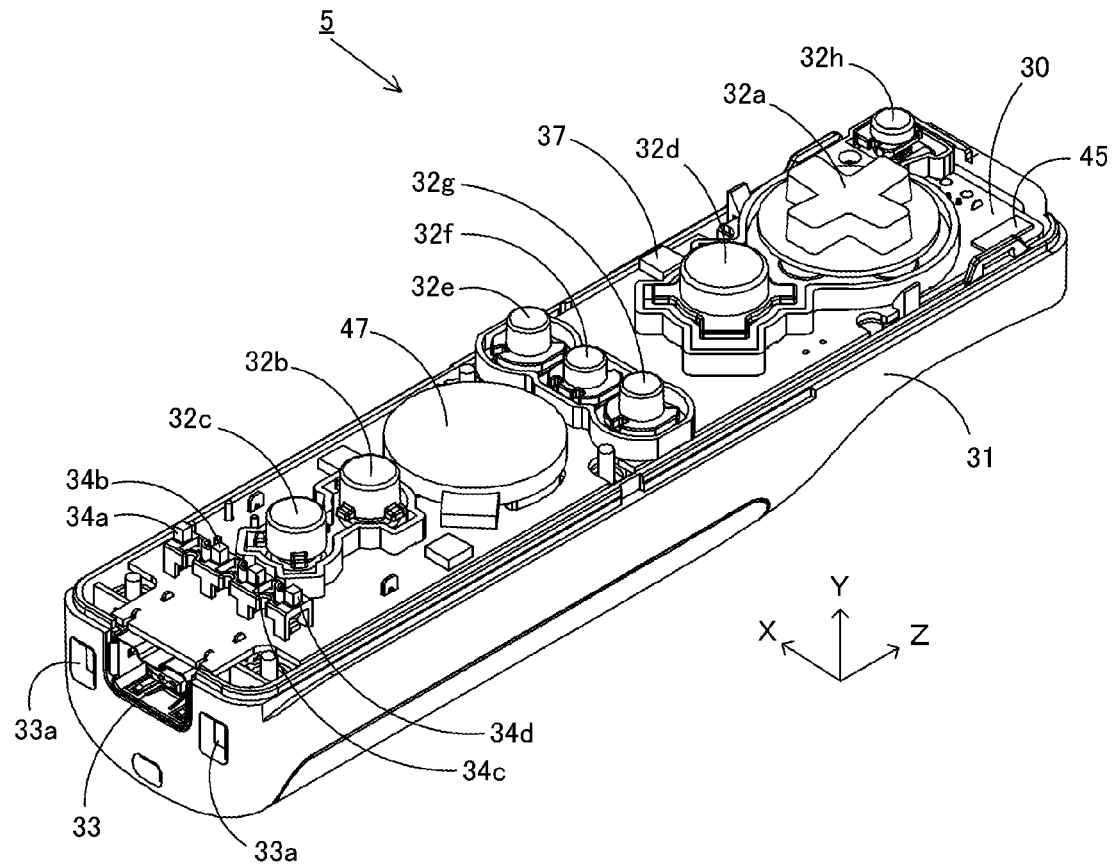
FIG. 5 is a diagram illustrating an internal configuration of the controller.
Figure 6:
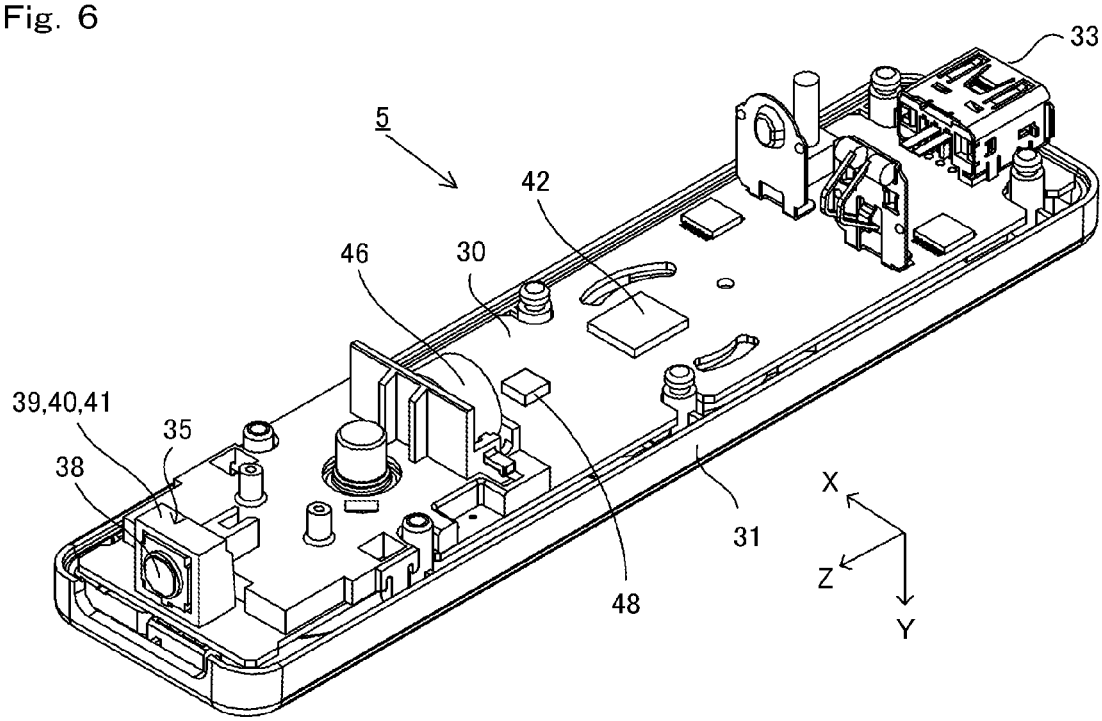
FIG. 6 is another diagram illustrating an internal configuration of the controller.

Next, with reference to FIGS. 5 and 6, an internal configuration of the controller 5 will be described. FIG. 5 and FIG. 6 are diagrams illustrating the internal configuration of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 47, and the like are provided. These elements are connected to a microcomputer 42 (see FIG. 6) via lines (not shown) formed on the substrate 30 and the like. In the present example embodiment, the acceleration sensor 37 is provided on a position offset from the center of the controller 5 with respect to the X-axis direction. Thus, calculation of the motion of the controller 5 being rotated about the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present example embodiment, the vibrator 46 is disposed slightly toward the front of the housing 31. That is, the vibrator 46 is positioned offset from the center toward the end of the controller 5, and therefore the vibration of the vibrator 46 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 47, and the like.

FIGS. 3 to 6 only show examples of the shape of the controller 5, the shape of each operation button, the number and the positions of acceleration sensors and vibrators, and so on, and other shapes, numbers, and positions may be employed. Further, although in the present example embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
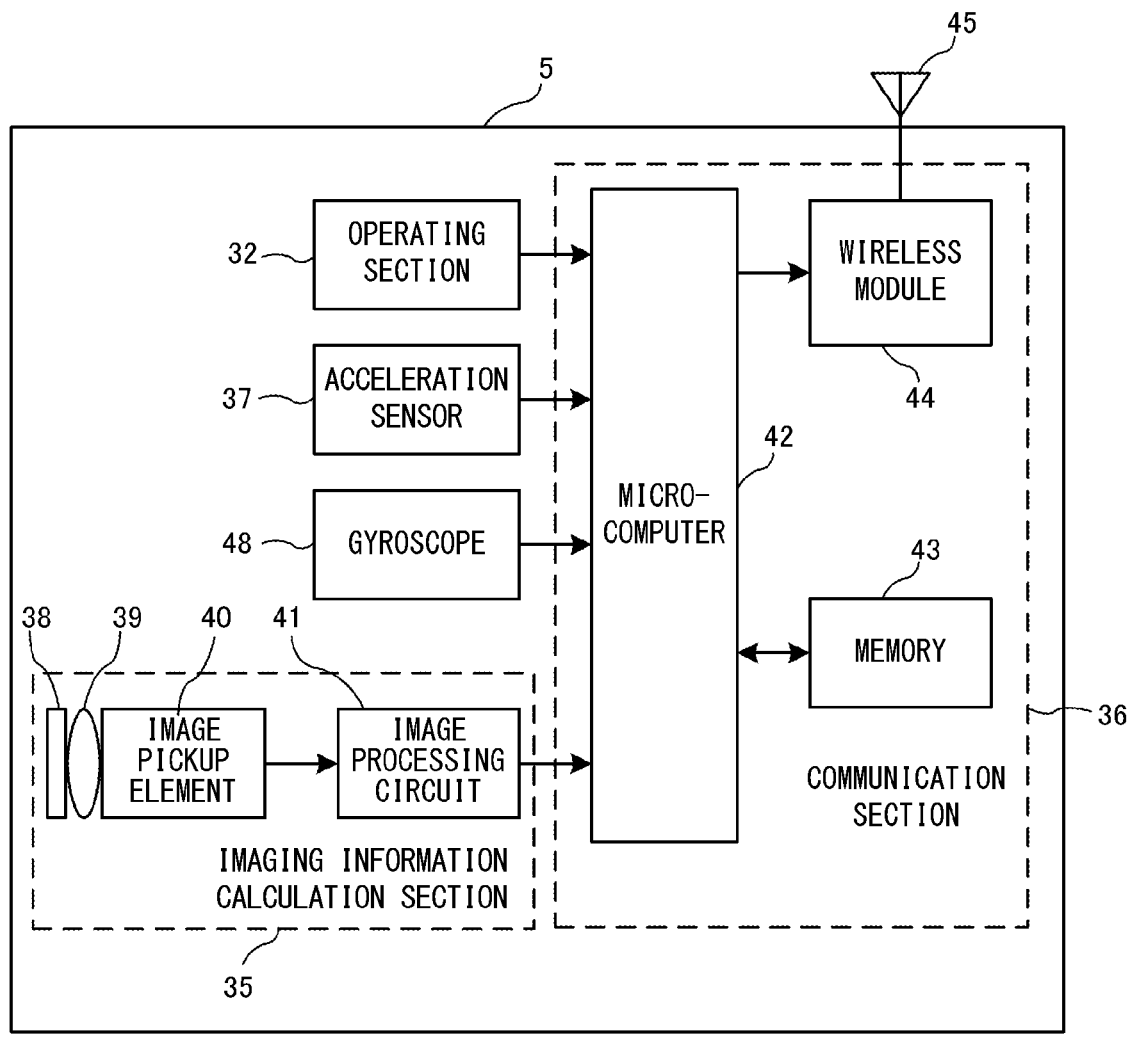
FIG. 7 is a block diagram illustrating a configuration of the controller.

FIG. 7 is a block diagram illustrating a configuration of the controller 5. The controller 5 includes an operating section 32 (the operation buttons 32a to 32i), the imaging information calculation section 35, a communication section 36, the acceleration sensor 37, and a gyroscope 48. The controller 5 transmits, as operation data, data representing the content of an operation performed on the controller 5 itself, to the game apparatus 3. Note that hereinafter, in some cases, operation data transmitted by the controller 5 is referred to as "controller operation data", and operation data transmitted by the terminal device 7 is referred to as "terminal operation data".

The operating section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The marker section 55 of the terminal device 7 and the marker device 6, which are subjects to be imaged, include markers for outputting infrared light. Therefore, the infrared filter 38 enables the image pickup element 40 to receive only the infrared light transmitted through the infrared filter 38 and generate image data, so that an image of each subject to be imaged (the marker section 55 and/or the marker device 6) can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged. The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the attitude (angle of tilt) and/or the position of the controller 5 itself, and therefore the game apparatus 3 is allowed to calculate the attitude and the position of the controller 5 using the marker coordinate point.

In another example embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. The acceleration sensor 37 is, for example, a capacitive MEMS (Micro-Electro Mechanical System) acceleration sensor. However, another type of acceleration sensor may be used.

In the present example embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the attitude (angle of tilt) and movement of the controller 5, and therefore the game apparatus 3 is allowed to calculate the attitude and movement of the controller 5 using the acquired acceleration data. In the present example embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted from the acceleration sensor 37 (or similarly from an acceleration sensor 63 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on movement of the acceleration sensor is eliminated from the detected acceleration through a predetermined process, whereby it is possible to determine the tilt of the controller 5 relative to the direction of gravity. In another example embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (e.g., gravitational acceleration), the embedded or dedicated processor could convert the acceleration signal to a corresponding angle of tilt (or another appropriate parameter).

The gyroscope 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyroscope 48 can detect the angular rates about the three axes, any number thereof may be used, and also any combination of sensors may be included therein. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis). For example, the gyroscope 48 may be a three-axis gyroscope or may include a combination of a two-axis gyroscope and a one-axis gyroscope to detect the angular rates about the three axes. Data representing the angular rates detected by the gyroscope 48 is outputted to the communication section 36. Alternatively, the gyroscope 48 may simply detect an angular rate about one axis or angular rates about two axes.

The communication section 36 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process.

Data outputted from the operating section 32, the imaging information calculation section 35, the acceleration sensor 37, and the gyroscope 48 to the microcomputer 42 is temporarily stored to the memory 43. The data is transmitted as operation data (controller operation data) to the game apparatus 3. Specifically, at the time of the transmission to the controller communication module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the operation data. The CPU 10 of the game apparatus 3 performs the game process using the operation data acquired from the controller 5. The wireless transmission from the communication section 36 to the controller communication module 19 is sequentially performed at a predetermined time interval. Since the game process is generally performed at a cycle of 1/60 sec. (corresponding to one frame time), data is transmitted at a cycle of a shorter time period. The communication section 36 of the controller 5 outputs, to the controller communication module 19 of the game apparatus 3, the operation data at intervals of ½₀₀ of a second, for example.

As described above, the controller 5 can transmit marker coordinate data, acceleration data, angular rate data, and operation button data as operation data representing operations performed thereon. In addition, the game apparatus 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the controller 5 to arbitrary attitudes, pointing the controller 5 to arbitrary positions on the screen, and moving the controller 5 itself.

Also, in the present example embodiment, the controller 5 is not provided with any display means for displaying game images, but the controller 5 may be provided with a display means for displaying an image or suchlike to indicate, for example, a remaining battery level.

[4. Configuration of the Terminal Device 7]

Figure 8:
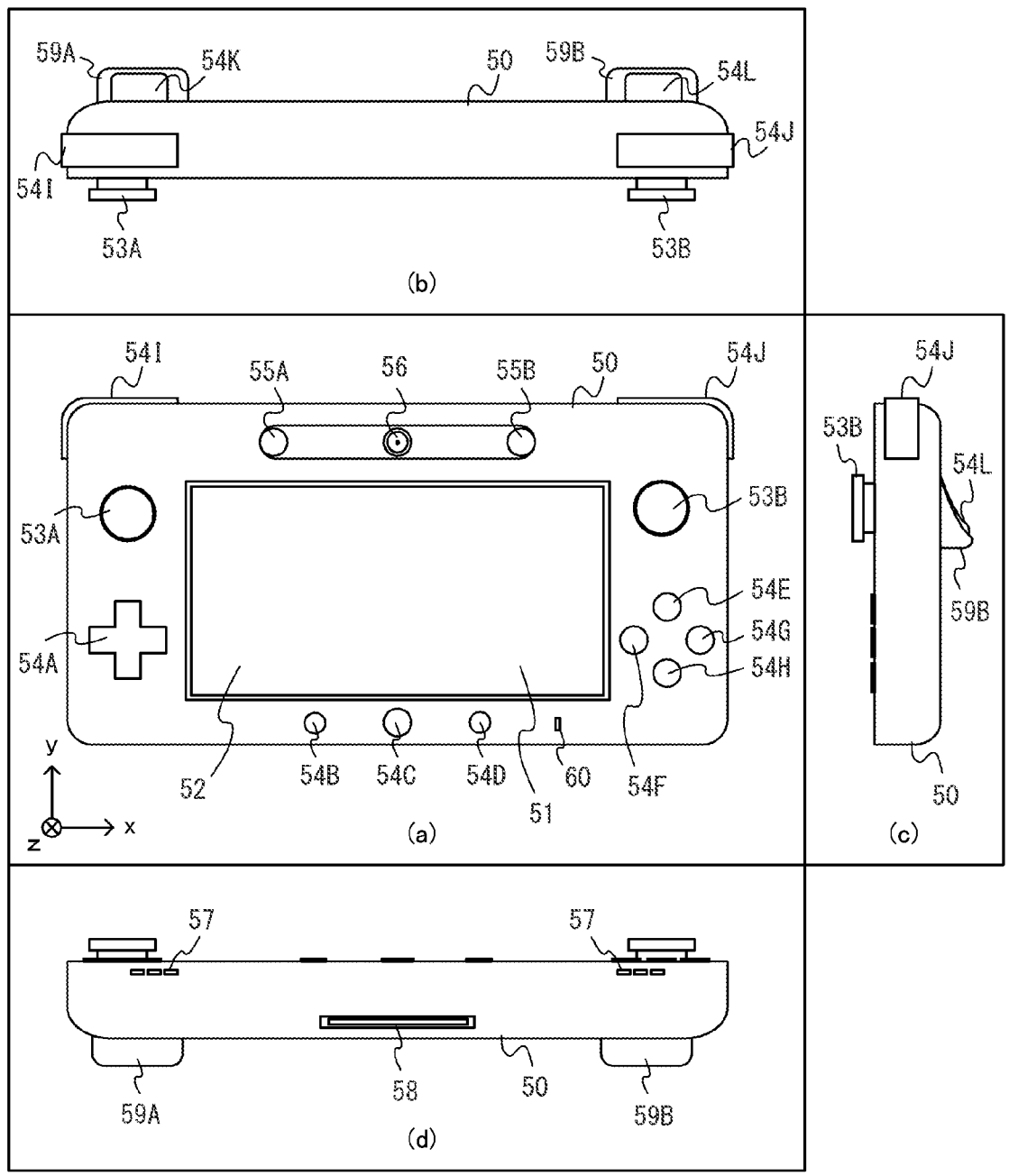
FIG. 8 is a diagram illustrating an external configuration of an example non-limiting terminal device.
Figure 9:
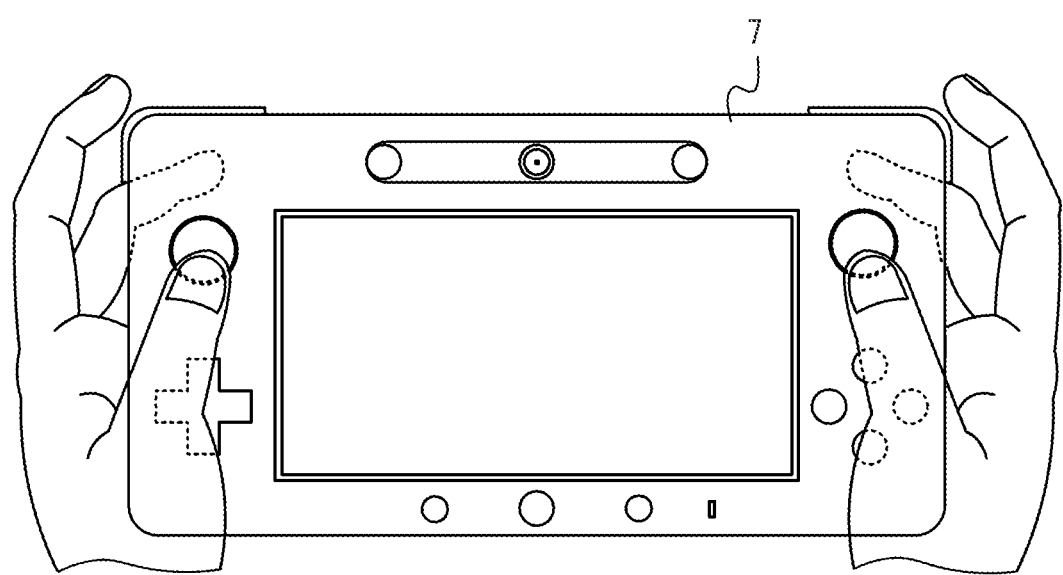
FIG. 9 is a diagram illustrating an example of the terminal device being held by the user.
Figure 10:
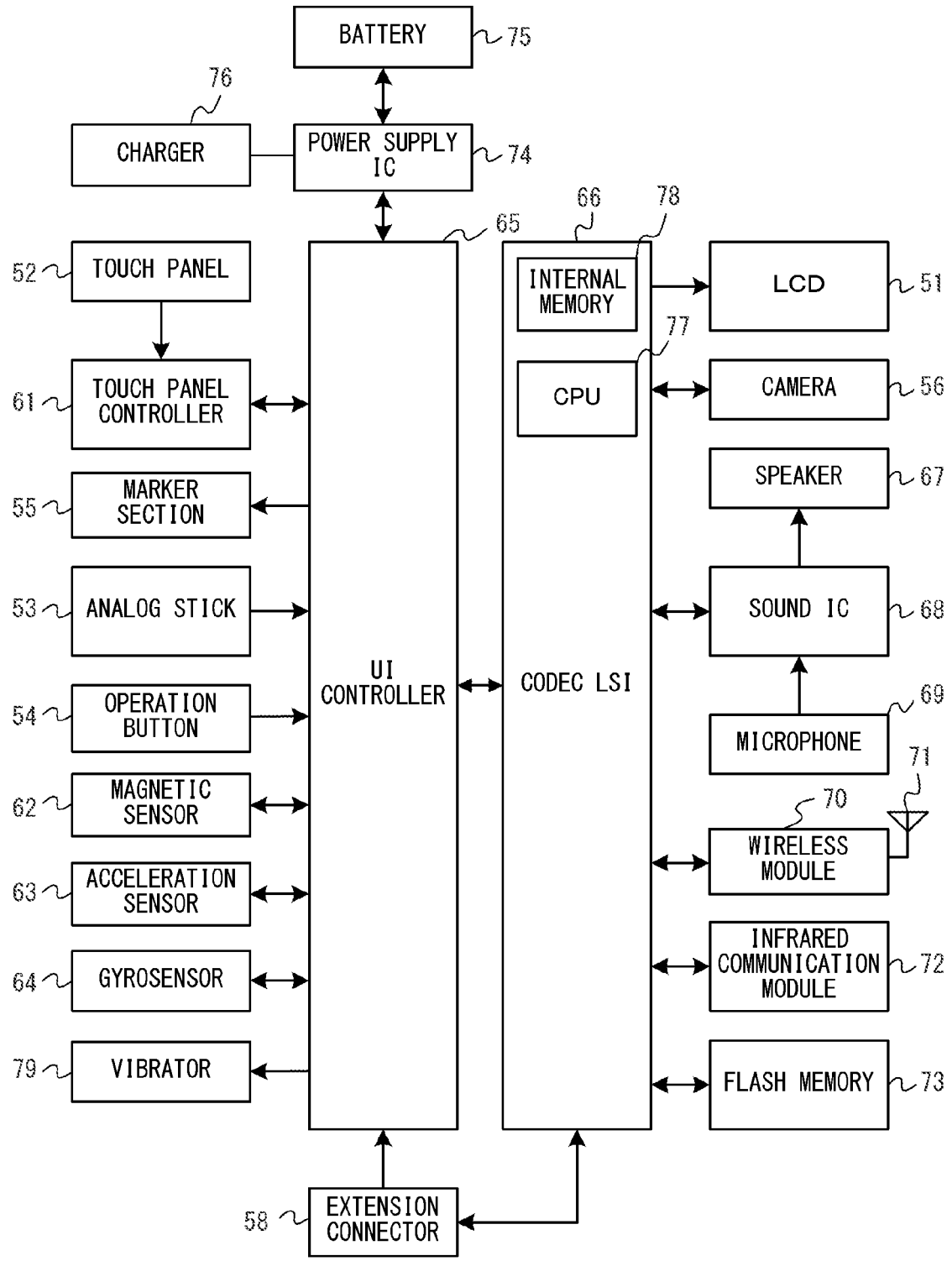
FIG. 10 is a block diagram illustrating an internal configuration of the terminal device.

Next, referring to FIGS. 8 to 10, the configuration of the terminal device 7 will be described. FIG. 8 provides views illustrating an external configuration of the terminal device 7. In FIG. 8, parts (a), (b), (c), and (d) are a front view, a top view, a right side view, and a bottom view, respectively, of the terminal device 7. FIG. 9 is a diagram illustrating the terminal device 7 being held by the user.

As shown in FIG. 8, the terminal device 7 has a housing 50 roughly shaped in the form of a horizontally rectangular plate. The housing 50 is sized to be held by the user. Thus, the user can hold and move the terminal device 7, and can change the position of the terminal device 7.

The terminal device 7 includes an LCD 51 on the front surface of the housing 50. The LCD 51 is provided approximately at the center of the surface of the housing 50. Therefore, the user can hold and move the terminal device while viewing the screen of the LCD 51 by holding the housing 50 by edges to the left and right of the LCD 51, as shown in FIG. 9. While FIG. 9 shows an example where the user holds the terminal device 7 horizontal (horizontally long) by holding the housing 50 by edges to the left and right of the LCD 51, the user can hold the terminal device 7 vertical (vertically long).

As shown in FIG. 8(*a*), the terminal device 7 includes a touch panel 52 on the screen of the LCD 51 as an operating means. In the present example embodiment, the touch panel 52 is a resistive touch panel. However, the touch panel is not limited to the resistive type, and may be of any type such as capacitive. The touch panel 52 may be single-touch or multi-touch. In the present example embodiment, a touch panel having the same resolution (detection precision) as the LCD 51 is used as the touch panel 52. However, the touch panel 52 and the LCD 51 do not have to be equal in resolution. While a stylus is usually used for providing input to the touch panel 52, input to the touch panel 52 can be provided not only by the stylus but also by the user's finger. Note that the housing 50 may be provided with an accommodation hole for accommodating the stylus used for performing operations on the touch panel 52. In this manner, the terminal device 7 includes the touch panel 52, and the user can operate the touch panel 52 while moving the terminal device 7. Specifically, the user can provide input directly to the screen of the LCD 51 (from the touch panel 52) while moving the screen.

As shown in FIG. 8, the terminal device 7 includes two analog sticks 53A and 53B and a plurality of buttons 54A to 54L, as operating means. The analog sticks 53A and 53B are devices capable of directing courses. Each of the analog sticks 53A and 53B is configured such that its stick portion to be operated with the user's finger is slidable or tiltable in an arbitrary direction (at an arbitrary angle in any of the up, down, left, right, and oblique directions) with respect to the surface of the housing 50. Moreover, the left analog stick 53A and the right analog stick 53B are provided to the left and the right, respectively, of the screen of the LCD 51. Accordingly, the user can provide an input for course direction using the analog stick with either the left or the right hand. In addition, as shown in FIG. 9, the analog sticks 53A and 53B are positioned so as to allow the user to operate them while holding the terminal device 7 at its left and right edges, and therefore the user can readily operate the analog sticks 53A and 53B while moving the terminal device 7 by hand.

The buttons 54A to 54L are operating means for providing predetermined input. As will be discussed below, the buttons 54A to 54L are positioned so as to allow the user to operate them while holding the terminal device 7 at its left and right edges (see FIG. 9). Therefore the user can readily manipulate the operating means while moving the terminal device 7 by hand.

As shown in FIG. 8(*a*), of all the operation buttons 54A to 54L, the cross button (direction input button) 54A and the buttons 54B to 54H are provided on the front surface of the housing 50. That is, these buttons 54A to 54G are positioned so as to allow the user to operate them with his/her thumbs (see FIG. 9).

The cross button 54A is provided to the left of the LCD 51 and below the left analog stick 53A. That is, the cross button 54A is positioned so as to allow the user to operate it with his/her left hand. The cross button 54A is a cross-shaped button which makes it possible to specify at least up, down, left and right directions. Also, the buttons 54B to 54D are provided below the LCD 51. These three buttons 54B to 54D are positioned so as to allow the user to operate them with either hand. Moreover, the four buttons 54E to 54H are provided to the right of the LCD 51 and below the right analog stick 53B. That is, the four buttons 54E to 54H are positioned so as to allow the user to operate them with the right hand. In addition, the four buttons 54E to 54H are positioned above, to the left of, to the right of, and below the central position among them. Therefore, the four buttons 54E to 54H of the terminal device 7 can be used to function as buttons for allowing the user to specify the up, down, left and right directions.

Furthermore, as shown in FIGS. 8(*a*), 8(*b*) and 8(*c*), the first L button 54I and the first R button 54J are provided at the upper (left and right) corners of the housing 50. Specifically, the first L button 54I is provided at the left edge of the top surface of the plate-like housing 50 so as to be exposed both from the top surface and the left-side surface. The first R button 54J is provided at the right edge of the top surface of the housing 50 so as to be exposed both from the top surface and the right-side surface. Thus, the first L button 54I is positioned so as to allow the user to operate it with the left index finger, and the first R button 54J is positioned so as to allow user to operate it with the right index finger (see FIG. 9).

Also, as shown in FIGS. 8(*b*) and 8(*c*), the second L button 54K and the second R button 54L are positioned at stands 59A and 59B, respectively, which are provided on the back surface of the plate-like housing 50 (i.e., the plane opposite to the surface where the LCD 51 is provided). The second L button 54K is provided at a comparatively high position on the right side of the back surface of the housing 50 (i.e., the left side as viewed from the front surface side), and the second R button 54L is provided at a comparatively high position on the left side of the back surface of the housing 50 (i.e., the right side as viewed from the front surface side). In other words, the second L button 54K is provided at a position approximately opposite to the left analog stick 53A provided on the front surface, and the second R button 54L is provided at a position approximately opposite to the right analog stick 53B provided on the front surface. Thus, the second L button 54K is positioned so as to allow the user to operate it with the left middle finger, and the second R button 54L is positioned so as to allow the user to operate it with the right middle finger (see FIG. 9). In addition, the second L button 54K and the second R button 54L are provided on the surfaces of the stands 59A and 59B that are directed obliquely upward, as shown in FIG. 8(c), and therefore, the second L button 54K and the second R button 54L have button faces directed obliquely upward. When the user holds the terminal device 7, the middle fingers will probably be able to move in the up/down direction, and therefore the button faces directed upward will allow the user to readily press the second L button 54K and the second R button 54L. Moreover, providing the stands on the back surface of the housing 50 allows the user to readily hold the housing 50, and furthermore, providing the buttons on the stands allows the user to readily operate the buttons while holding the housing 50.

Note that the terminal device 7 shown in FIG. 8 has the second L button 54K and the second R button 54L provided at the back surface, and therefore when the terminal device 7 is placed with the screen of the LCD 51 (the front surface of the housing 50) facing up, the screen might not be completely horizontal. Accordingly, in another example embodiment, three or more stands may be formed on the back surface of the housing 50. As a result, when the terminal device 7 is placed on the floor with the screen of the LCD 51 facing upward, all the stands contact the floor, so that the screen can be horizontal. Alternatively, the terminal device 7 may be placed horizontally by adding a detachable stand.

The buttons 54A to 54L are each appropriately assigned a function in accordance with the game program. For example, the cross button 54A and the buttons 54E to 54H may be used for direction-specifying operations, selection operations, etc., whereas the buttons 54B to 54D may be used for setting operations, cancellation operations, etc.

Although not shown in the figures, the terminal device 7 includes a power button for turning ON/OFF the terminal device 7. Moreover, the terminal device 7 may also include buttons for turning ON/OFF the screen of the LCD 51, performing a connection setting (pairing) with the game apparatus 3, and controlling the volume of speakers (speakers 67 shown in FIG. 10).

As shown in FIG. 8(a), the terminal device 7 has a marker section (a marker section 55 shown in FIG. 10), including markers 55A and 55B, provided on the front surface of the housing 50. The marker section 55 is provided in the upper portion of the LCD 51. The markers 55A and 55B are each formed by one or more infrared LEDs, as are the markers 6R and 6L of the marker device 6. The marker section 55 is used for the game apparatus 3 to calculate, for example, the motion of the controller 5, as is the marker device 6 described above. In addition, the game apparatus 3 can control the lighting of the infrared LEDs included in the marker section 55.

The terminal device 7 includes the camera 56 which is an image pickup section. The camera 56 includes an image pickup element (e.g., a CCD image sensor, a CMOS image sensor, or the like) having a predetermined resolution, and a lens. As shown in FIG. 8, in the present example embodiment, the camera 56 is provided on the front surface of the housing 50. Therefore, the camera 56 can pick up an image of the face of the user holding the terminal device 7, and can pick up an image of the user playing a game while viewing the LCD 51, for example. Note that in the present example embodiment, the image pickup section (camera 56) is provided in a direction that an image of the display section (LCD 51) can be picked up from in front of the display section's screen. That is, the camera 56 is provided on the surface of the housing 50. However, in another example embodiment, the camera 56 is provided in any arbitrary position, and may be provided so as to pick up an image from another direction.

Note that the terminal device 7 includes a microphone (a microphone 69 shown in FIG. 10) which is a sound input means. A microphone hole 60 is provided in the front surface of the housing 50. The microphone 69 is provided inside the housing 50 behind the microphone hole 60. The microphone detects sounds around the terminal device 7 such as the voice of the user.

The terminal device 7 includes speakers (speakers 67 shown in FIG. 10) which are sound output means. As shown in FIG. 8(d), speaker holes 57 are provided in the bottom surface of the housing 50. Sound emitted by the speakers 67 is outputted from the speaker holes 57. In the present example embodiment, the terminal device 7 includes two speakers, and the speaker holes 57 are provided at positions corresponding to the left and right speakers.

Also, the terminal device 7 includes an expansion connector 58 for connecting another device to the terminal device 7. In the present example embodiment, the expansion connector 58 is provided at the bottom surface of the housing 50, as shown in FIG. 8(d). Any additional device may be connected to the expansion connector 58, including, for example, a game-specific controller (a gun-shaped controller or suchlike) or an input device such as a keyboard. The expansion connector 58 may be omitted if there is no need to connect any additional devices to terminal device 7.

Note that as for the terminal device 7 shown in FIG. 8, the shapes of the operation buttons and the housing 50, the number and arrangement of components, etc., are merely illustrative, and other shapes, numbers, and arrangements may be employed.

Next, an internal configuration of the terminal device 7 will be described with reference to FIG. 10. FIG. 10 is a block diagram illustrating the internal configuration of the terminal device 7. As shown in FIG. 10, in addition to the components shown in FIG. 8, the terminal device 7 includes a touch panel controller 61, a magnetic sensor 62, the acceleration sensor 63, the gyroscope 64, a user interface controller (UI controller) 65, a codec LSI 66, the speakers 67, a sound IC 68, the microphone 69, a wireless module 70, an antenna 71, an infrared communication module 72, flash memory 73, a power supply IC 74, a battery 75, and a vibrator 79. These electronic components are mounted on an electronic circuit board and accommodated in the housing 50.

The UI controller 65 is a circuit for controlling the input/output of data to/from various input/output sections. The UI controller 65 is connected to the touch panel controller 61, an analog stick section 53 (including the analog sticks 53A and 53B), an operation button group 54 (including the operation buttons 54A to 54L), the marker section 55, the magnetic sensor 62, the acceleration sensor 63, the gyroscope 64, and the vibrator 79. The UI controller 65 is connected to the codec LSI 66 and the expansion connector 58. The power supply IC 74 is connected to the UI controller 65, and power is supplied to various sections via the UI controller 65. The built-in battery 75 is connected to the power supply IC 74 to supply power. A charger 76 or a cable with which power can be obtained from an external power source can be connected to the power supply IC 74 via a charging connector, and the terminal device 7 can be charged with power supplied from an external power source using the charger 76 or the cable. Note that the terminal device 7 can be charged by being placed in an unillustrated cradle having a charging function.

The touch panel controller 61 is a circuit connected to the touch panel 52 for controlling the touch panel 52. The touch panel controller 61 generates touch position data in a predetermined format based on signals from the touch panel 52, and outputs it to the UI controller 65. The touch position data represents, for example, the coordinates of a position on the input surface of the touch panel 52 at which an input has been made. The touch panel controller 61 reads a signal from the touch panel 52 and generates touch position data once per a predetermined period of time. Various control instructions for the touch panel 52 are outputted from the UI controller 65 to the touch panel controller 61.

The analog stick section 53 outputs, to the UI controller 65, stick data representing the direction and the amount of sliding (or tilting) of the stick portion operated with the user's finger. The operation button group 54 outputs, to the UI controller 65, operation button data representing the input status of each of the operation buttons 54A to 54L (regarding whether it has been pressed).

The magnetic sensor 62 detects an azimuth by sensing the magnitude and the direction of a magnetic field. Azimuthal direction data representing the detected azimuth is outputted to the UI controller 65. Control instructions for the magnetic sensor 62 are outputted from the UI controller 65 to the magnetic sensor 62. While there are sensors using, for example, an MI (magnetic impedance) element, a fluxgate sensor, a Hall element, a GMR (giant magnetoresistance) element, a TMR (tunnel magnetoresistance) element, or an AMR (anisotropic magnetoresistance) element, the magnetic sensor 62 may be of any type so long as it is possible to detect the azimuth. Strictly speaking, in a place where there is a magnetic field in addition to the geomagnetic field, the obtained azimuth data does not represent the azimuth. Nevertheless, if the terminal device 7 moves, the azimuth data changes, and it is therefore possible to calculate the change in the attitude of the terminal device 7.

The acceleration sensor 63 is provided inside the housing 50 for detecting the magnitude of linear acceleration along each direction of three axes (the x-, y- and z-axes shown in FIG. 8(*a*)). Specifically, the acceleration sensor 63 detects the magnitude of linear acceleration along each axis, where the longitudinal direction of the housing 50 is taken as the x-axis, the width direction of the housing 50 as the y-axis, and a direction perpendicular to the front surface of the housing 50 as the z-axis. Acceleration data representing the detected acceleration is outputted to the UI controller 65. Also, control instructions for the acceleration sensor 63 are outputted from the UI controller 65 to the acceleration sensor 63. In the present example embodiment, the acceleration sensor 63 is assumed to be, for example, a capacitive MEMS acceleration sensor, but in another example embodiment, an acceleration sensor of another type may be employed. The acceleration sensor 63 may be an acceleration sensor for detection in one axial direction or two axial directions.

The gyroscope 64 is provided inside the housing 50 for detecting angular rates about the three axes, i.e., the x-, y-, and z-axes. Angular rate data representing the detected angular rates is outputted to the UI controller 65. Also, control instructions for the gyroscope 64 are outputted from the UI controller 65 to the gyroscope 64. Note that any number and combination of gyroscopes may be used for detecting angular rates about the three axes, and similar to the gyroscope 48, the gyroscope 64 may include a two-axis gyroscope and a one-axis gyroscope. Alternatively, the gyroscope 64 may be a gyroscope for detection in one axial direction or two axial directions.

The vibrator 79 is, for example, a vibration motor or a solenoid, and is connected to the UI controller 65. The terminal device 7 is vibrated by actuation of the vibrator 79 based on an instruction from the UI controller 65. Therefore, the vibration is conveyed to the user's hand holding the terminal device 7, and thus a so-called vibration-feedback game is realized.

The UI controller 65 outputs operation data to the codec LSI 66, including touch position data, stick data, operation button data, azimuth data, acceleration data, and angular rate data received from various components described above. If another device is connected to the terminal device 7 via the expansion connector 58, data representing an operation performed on that device may be further included in the operation data.

The codec LSI 66 is a circuit for performing a compression process on data to be transmitted to the game apparatus 3, and a decompression process on data transmitted from the game apparatus 3. The LCD 51, the camera 56, the sound IC 68, the wireless module 70, the flash memory 73, and the infrared communication module 72 are connected to the codec LSI 66. The codec LSI 66 includes a CPU 77 and internal memory 78. While the terminal device 7 does not perform any game process itself, the terminal device 7 may execute programs for its own management and communication purposes. Upon power-on, the CPU 77 executes a program loaded into the internal memory 78 from the flash memory 73, thereby starting up the terminal device 7. Also, some area of the internal memory 78 is used as VRAM for the LCD 51.

The camera 56 picks up an image in response to an instruction from the game apparatus 3, and outputs data for the pickup image to the codec LSI 66. Also, control instructions for the camera 56, such as an image pickup instruction, are outputted from the codec LSI 66 to the camera 56. Note that the camera 56 can also record video. Specifically, the camera 56 can repeatedly pick up images and repeatedly output image data to the codec LSI 66.

The sound IC 68 is a circuit connected to the speakers 67 and the microphone 69 for controlling input/output of sound data to/from the speakers 67 and the microphone 69. Specifically, when sound data is received from the codec LSI 66, the sound IC 68 outputs to the speakers 67 a sound signal obtained by performing D/A conversion on the sound data so that sound is outputted from the speakers 67. The microphone 69 senses sound propagated to the terminal device 7 (e.g., the user's voice), and outputs a sound signal representing the sound to the sound IC 68. The sound IC 68 performs A/D conversion on the sound signal from the microphone 69 to output sound data in a predetermined format to the codec LSI 66.

The infrared communication module 72 emits an infrared signal to perform infrared communication with another device. Here, for example, the infrared communication module 72 has the function of performing infrared communication in accordance with the IrDA standard and the function of outputting an infrared signal to control the television 2.

The codec LSI 66 transmits image data from the camera 56, sound data from the microphone 69, and terminal operation data from the UI controller 65 to the game apparatus 3 via the wireless module 70. In the present example embodiment, the codec LSI 66 subjects the image data and the sound data to a compression process as the codec LSI 27 does. The terminal operation data, along with the compressed image data and sound data, is outputted to the wireless module 70 as transmission data. The antenna 71 is connected to the wireless module 70, and the wireless module 70 transmits the transmission data to the game apparatus 3 via the antenna 71. The wireless module 70 has a similar function to that of the terminal communication module 28 of the game apparatus 3. Specifically, the wireless module 70 has a function of connecting to a wireless LAN by a scheme in conformity with the IEEE 802.11n standard, for example. Data to be transmitted may or may not be encrypted depending on the situation.

As described above, the transmission data to be transmitted from the terminal device 7 to the game apparatus 3 includes operation data (terminal operation data), image data, and sound data. In the case where another device is connected to the terminal device 7 via the expansion connector 58, data received from that device may be further included in the transmission data. The codec LSI 66 may transmit data received via infrared communication by the infrared communication module 72 to the game apparatus 3, along with the aforementioned transmission data, where appropriate.

As described above, compressed image data and sound data are transmitted from the game apparatus 3 to the terminal device 7. These data items are received by the codec LSI 66 via the antenna 71 and the wireless module 70. The codec LSI 66 decompresses the received image data and sound data. The decompressed image data is outputted to the LCD 51, and images are displayed on the LCD 51. The decompressed sound data is outputted to the sound IC 68, and the sound IC 68 outputs sound from the speakers 67.

Also, in the case where control data is included in the data received from the game apparatus 3, the codec LSI 66 and the UI controller 65 give control instructions to various sections in accordance with the control data. As described above, the control data is data representing control instructions for the components of the terminal device 7 (in the present example embodiment, the camera 56, the touch panel controller 61, the marker section 55, sensors 62 to 64, the infrared communication module 72, and the vibrator 79). In the present example embodiment, the control instructions represented by the control data are conceivably instructions to activate or deactivate (suspend) the components. Specifically, any components that are not used in a game may be deactivated in order to reduce power consumption, and in such a case, data from the deactivated components is not included in the transmission data to be transmitted from the terminal device 7 to the game apparatus 3. Note that the marker section 55 is configured by infrared LEDs, and therefore is simply controlled for power supply to be ON/OFF.

Furthermore, the game apparatus 3 is capable of controlling output of the infrared communication module 72, thereby controlling the operation of the television 2. Specifically, the game apparatus 3 outputs an instruction (control data as mentioned above) to the terminal device 7, thereby causing the infrared communication module 72 to output an infrared signal corresponding to a control command for controlling the television 2. In response to this instruction, the codec LSI 66 causes the infrared communication module 72 to output an infrared signal corresponding to the control command. Here, the television 2 includes an infrared light reception section capable of receiving the infrared signal. By the infrared light reception section receiving the infrared signal outputted by the infrared communication module 72, the television 2 operates in accordance with the infrared signal. Note that the instruction from the game apparatus 3 may indicate the pattern of the infrared signal, or when the terminal device 7 has the infrared signal pattern stored therein, the game apparatus 3 may provide an instruction to indicate the pattern.

While the terminal device 7 includes operating means such as the touch panel 52, the analog sticks 53 and the operation button group 54, as described above, in another example embodiment, other operating means may be included in place of or in addition to these operating means.

Also, while the terminal device 7 includes the magnetic sensor 62, the acceleration sensor 63 and the gyroscope 64 as sensors for calculating the motion of the terminal device 7 (including its position and attitude or changes in its position and attitude), in another example embodiment, only one or two of the sensors may be included. Furthermore, in another example embodiment, any other sensor may be included in place of or in addition to these sensors.

Also, while the terminal device 7 includes the camera 56 and the microphone 69, in another example embodiment, the terminal device 7 may or may not include the camera 56 and the microphone 69 or it may include only one of them.

Also, while the terminal device 7 includes the marker section 55 as a feature for calculating the positional relationship between the terminal device 7 and the controller 5 (e.g., the position and/or the attitude of the terminal device 7 as seen from the controller 5), in another example embodiment, it may not include the marker section 55. Furthermore, in another example embodiment, the terminal device 7 may include another means as the aforementioned feature for calculating the positional relationship. For example, in another example embodiment, the controller 5 may include a marker section, and the terminal device 7 may include an image pickup element. Moreover, in such a case, the marker device 6 may include an image pickup element in place of an infrared LED.

[5. Outline of the Game Processing]

Next, the game processing to be executed in the game system 1 of the present example embodiment will be outlined with reference to FIGS. 11 to 14. In the present example embodiment, a game image representing a three-dimensional virtual space (game space) is displayed on two display devices, i.e., the television 2 and the terminal device 7. Moreover, the player performs a game operation using the terminal device 7. That is, the terminal device 7 is used not only as a display device but also as an operating device. Therefore, the controller 5 is not used and even might not be included in the game system 1.

Figure 11:
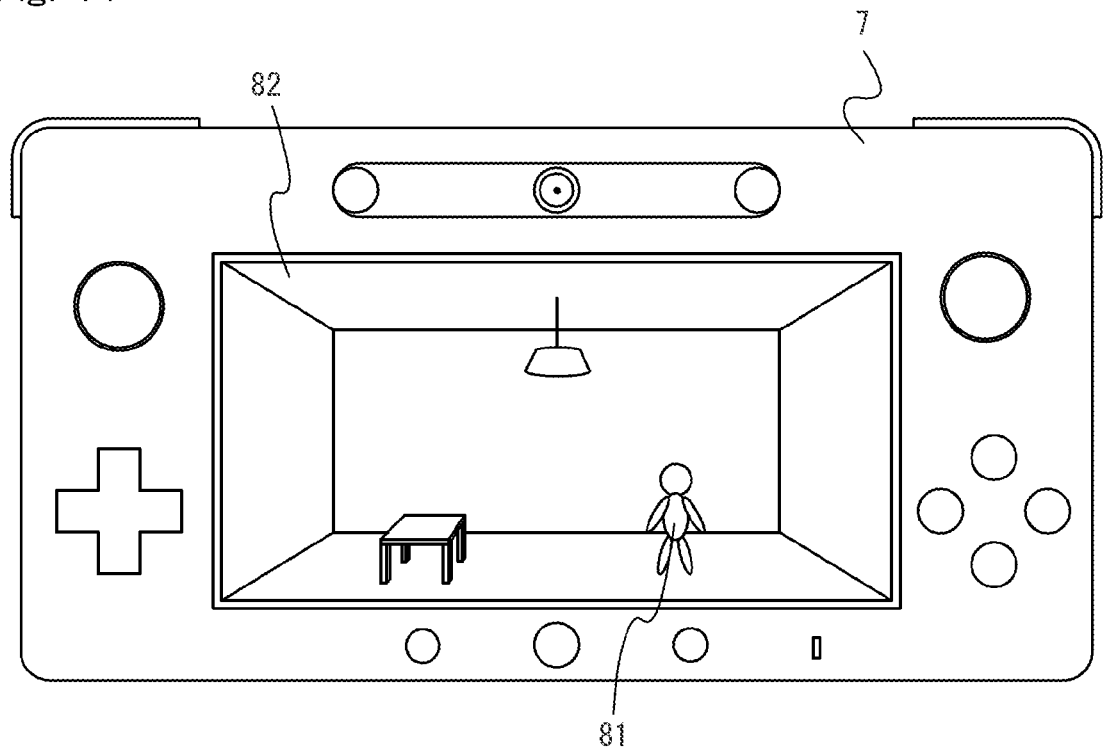
FIG. 11 is a diagram illustrating an example game image displayed on the terminal device in an example embodiment.

FIG. 11 is a diagram illustrating an example game image displayed on the terminal device 7 in the present example embodiment. The terminal device 7 displays an image of a virtual space as viewed from a virtual camera, as shown in FIG. 11. Hereinafter, the virtual camera for use in generating a terminal image to be displayed on the terminal device 7 will be referred to as the "terminal virtual camera". In addition, in the present example embodiment, a room 82 is arranged in the virtual space, and a character (midget) object 81 is arranged in the room 82. The room 82 is shaped like a rectangular parallelepiped with one open surface, and the terminal virtual camera is arranged with the opening corresponding to the position of the screen of the LCD 51. In this manner, the terminal virtual camera is set in a direction looking into the room 82 from outside via the opening.

Figure 12:
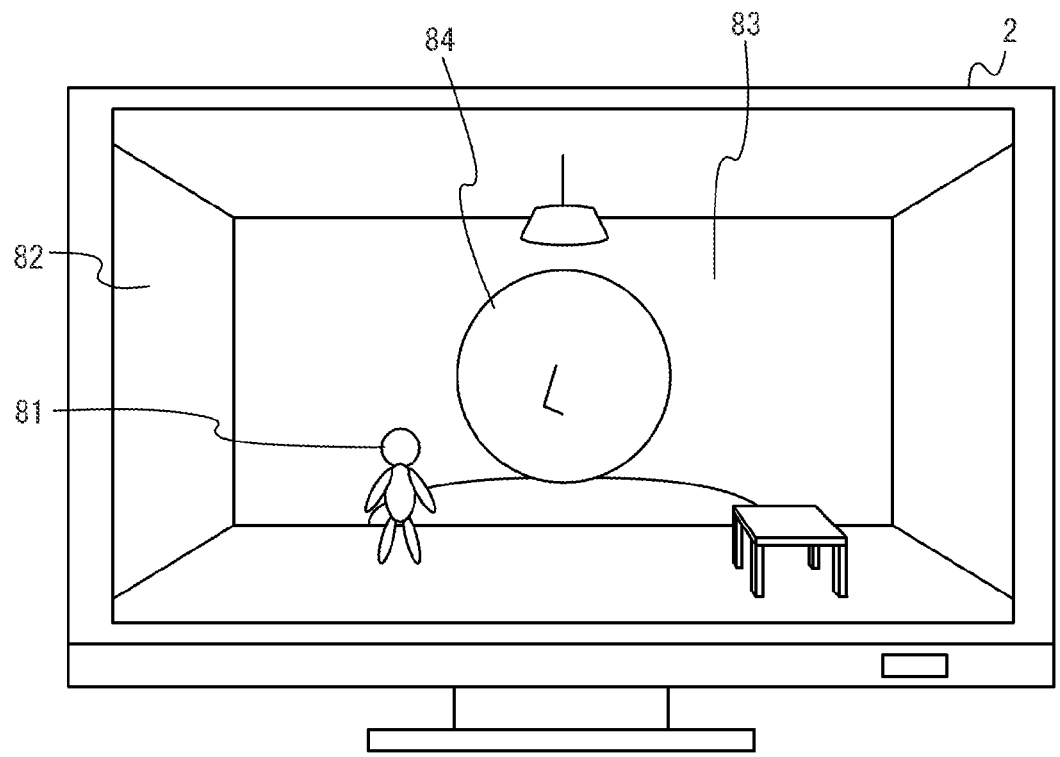
FIG. 12 is a diagram illustrating an example game image displayed on a television 2 in the example embodiment.

FIG. 12 is a diagram illustrating an example game image displayed on the television 2 in the present example embodiment. The television 2 displays an image of the virtual space as viewed from a virtual camera different from the terminal virtual camera, as shown in FIG. 12. Hereinafter, the virtual camera for use in generating a television image to be displayed on the television 2 will be referred to as the "television virtual camera". As shown in FIG. 12, the television virtual camera is set in a direction looking out of the room 82 via the opening. Here, the television image is an image with (at least a portion of) a pickup image arranged in the virtual space. In FIG. 12, a pickup image 83 including (an image of) the player 84 is rendered at the position of the open surface. Accordingly, the player viewing the television image can feel as if there were a real space beyond the virtual space, more specifically, as if the player 84 in the real space existed outside the room 82 in the virtual space.

As described above, in the present example embodiment, an image to be displayed on the television 2 is generated by synthesizing a pickup image with an image of the virtual space (game space) as viewed from the television virtual camera (FIG. 12). On the other hand, an image of the virtual space as viewed from the terminal virtual camera different from the television virtual camera is generated and displayed on the terminal device 7 (FIG. 11). As a result, the television 2 displays a television image as if the real space were being viewed from the virtual space, and the terminal device 7 displays a terminal image as if the virtual space were being viewed from the real space. Accordingly, by viewing the television images and the terminal image, the player can feel as if the virtual space actually existed and were connected to the real space, so that the player can perceive the virtual space to be more real (and possible). That is, in the present example embodiment, the terminal device 7 displays the virtual space, and the television 2 displays an image obtained by synthesizing a pickup image with an image representing the virtual space, thereby making the virtual space more real. Concretely, the player can feel as if the virtual space actually existed in depth beyond the screen of the terminal device 7, i.e., as if a midget were actually present in the room 82 on the terminal device 7.

Figure 13:
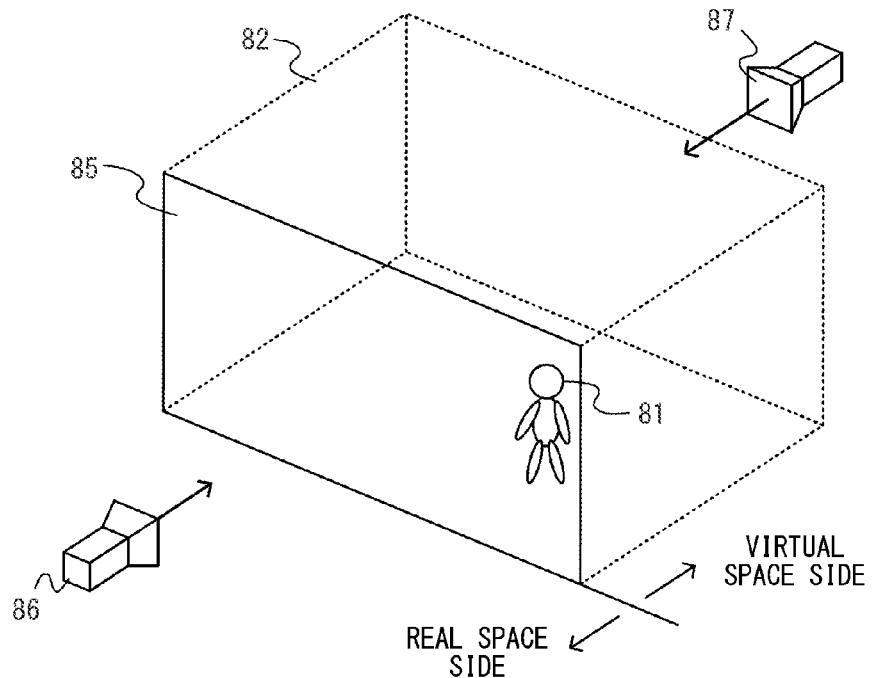
FIG. 13 is a diagram illustrating an example virtual space as viewed from the terminal virtual camera side.
Figure 14:
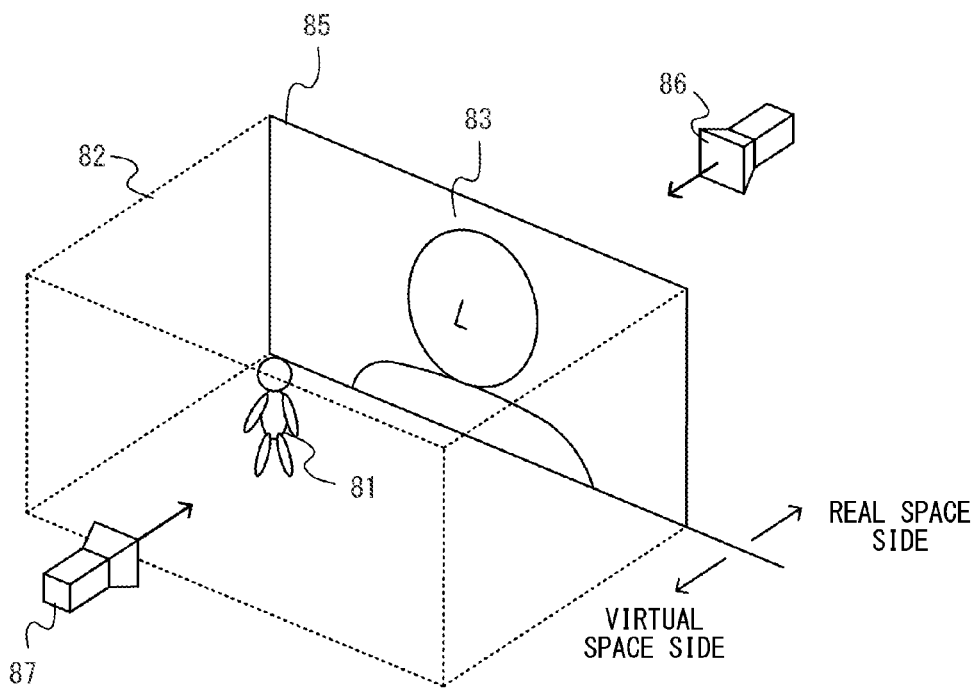
FIG. 14 is a diagram illustrating the virtual space as viewed from the television virtual camera side.

Next, referring to FIGS. 13 and 14, the method for setting the virtual cameras (the terminal virtual camera and the television virtual camera) will be outlined. FIG. 13 is a diagram illustrating the virtual space as viewed from the terminal virtual camera side. FIG. 14 is a diagram illustrating the virtual space as viewed from the television virtual camera side. A plane 85 shown in FIGS. 13 and 14 is arranged in the virtual space, and here, the plane 85 is positioned in the opening of the room 82. As will be described in detail later, in the present example embodiment, a pickup image 83 is rendered on the plane 85. Accordingly, the plane 85 is also referred to below as the "rendering plane". Note that in the present example embodiment, an object corresponding to the plane 85 is arranged in the virtual space, but in another example embodiment, the plane 85 is not actually arranged. That is, in the present example embodiment, the virtual cameras 86 and 87 are set on the basis of the position of the plane 85, but the virtual cameras 86 and 87 are not necessarily set as such so long as they are in a positional relationship as described below.

The virtual cameras 86 and 87 are set so as to face approximately opposite directions, as shown in FIGS. 13 and 14. Specifically, the television virtual camera 87 is directed to the plane 85 from one side, and the terminal virtual camera 86 is directed to the plane 85 from the other side. More specifically, the game apparatus 3 sets the position of the television virtual camera 87 on one side of the plane 85, and the position of the terminal virtual camera 86 on the other side, and then sets the directions of the virtual cameras 86 and 87 such that the plane 85 lies within the range of each camera's field of view. In this manner, the virtual cameras 86 and 87 are set so as to be positioned in front of each other.

By setting the virtual cameras 86 and 87 as described above, the terminal device 7 displays the virtual space as viewed from one side of the plane 85, and the television 2 displays the virtual space as viewed from the other side. In this case, the line-of-sight direction in the terminal image is from the front side of the screen of the terminal device 7 to the rear, and is the same as the player's line-of-sight direction. On the other hand, with reference to the virtual space displayed on the terminal device 7, the line-of-sight direction in the television image is from the rear side of the screen of the terminal device 7 toward the front, and is approximately opposite to the player's line-of-sight direction (which is approximately the same as the shooting direction of the camera 56 of the terminal device 7). Accordingly, the television image is provided as an image as viewed from the rear side of the screen of the terminal device 7 toward the player. By setting the virtual cameras 86 and 87 in this manner, the terminal device 7 displays an image with the line-of-sight direction from the front of the screen toward the rear, and the television 2 displays an image with the line-of-sight direction from the rear of the screen toward the front. Thus, the virtual space represented by each image can appear more real.

Furthermore, an image of the virtual space as viewed from the terminal virtual camera 86 is generated as a terminal image to be displayed on the terminal device 7. In this case, the terminal image is generated without the plane 85 (or with the plane 85 being transparent). That is, the terminal image includes no pickup image 83. On the other hand, an image obtained by synthesizing a pickup image 83 with an image of the virtual space as viewed from the television virtual camera 87 is generated as a television image to be displayed on the television 2. Note that the pickup image 83 to be synthesized is not always an entire image obtained by the camera 56, and may be a portion of the entire image or an image obtained by subjecting the entire image to a predetermined correction. Moreover, in the present example embodiment, the television image has the pickup image 83 displayed at the position of the plane 85. More specifically, when generating the television image, the pickup image is rendered at the position of the plane 85.

As described above, in the present example embodiment, the television image has the pickup image displayed at the position of the plane 85. Accordingly, the player has a perception as if the virtual space existed on the side of the television virtual camera 87 with respect to the plane 85, and as if the real space were on the side of the terminal virtual camera 86 (see FIGS. 13 and 14). The player feels as if the virtual space were connected to the real space via the plane 85, so the virtual space can appear more real.

Note that in the present example embodiment, the virtual cameras 86 and 87 are set on the basis of the position of the plane 85, but in another example embodiment, the virtual cameras are not always set on the basis of the plane 85. For example, the virtual cameras may be set in positions and attitudes which satisfy the aforementioned positional relationship, or either of the virtual cameras may be set on the basis of the other's settings.

Note that in the present example embodiment, the plane 85 corresponds to the opening of the room 82, but the plane 85 may be arranged at any arbitrary position in the virtual space. In the case where the virtual cameras 86 and 87 are directed to the plane 85 from opposite sides, and the television image has a pickup image displayed at the position of the plane 85, the player can feel as if the virtual space were connected to the real space via the plane 85.

Furthermore, in the present example embodiment, so long as the virtual cameras 86 and 87 are directed to the plane 85 from opposite sides, their specific positions and directions may be set arbitrarily. For example, in FIG. 13, the terminal virtual camera 86 is set such that the outer perimeter of its field-of-view range corresponds to the circumference of the plane 85, but this is not restrictive. In addition, the line-of-sight directions in the virtual cameras 86 and 87 are not always perpendicular to the plane 85.

Note that in the present example embodiment, the player communicates with the midget (object 81) within the virtual space in various manners. As will be described in detail later, the player uses the terminal device 7 to perform various game operations, and the game apparatus 3 adds changes to the virtual space in accordance with the game operations, thereby controlling the action and behavior of objects (including the midget) within the virtual space. In the present example embodiment, the virtual space is represented to appear real as if it were connected with the real space, as described above, and therefore, the player can feel as if the midget existed inside the terminal device 7.

[6. Details of the Game Processing]

Figure 15:
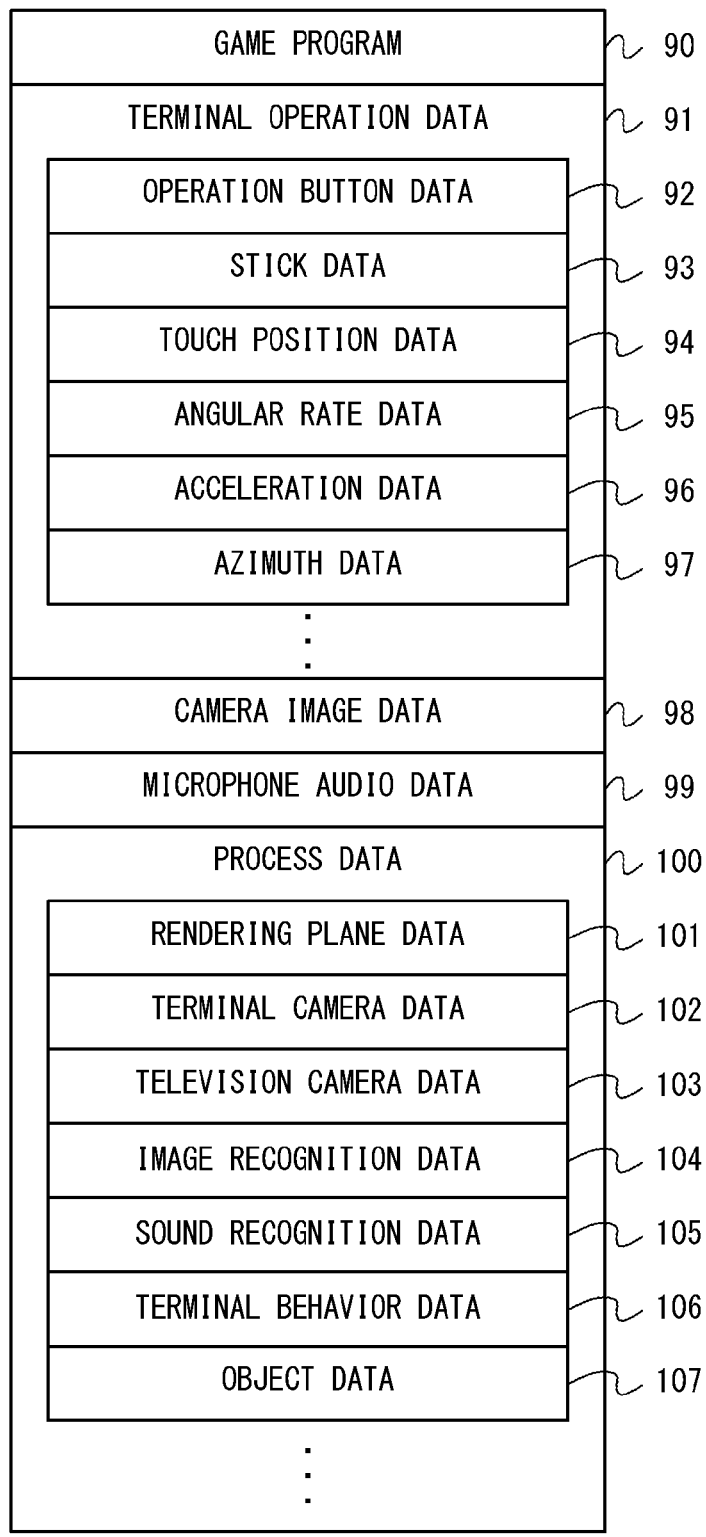
FIG. 15 is a diagram illustrating various types of example data for use in game processing.

Next, the game processing executed in the present game system will be described in detail. First, various types of data for use in the game processing will be described. FIG. 15 is a diagram illustrating the data for use in the game processing. The data shown in FIG. 15 are main data stored in the main memory (the external main memory 12 or the internal main memory 11e) of the game apparatus 3. As shown in FIG. 15, the main memory of the game apparatus 3 has stored therein a game program 90, terminal operation data 91, camera image data 98, microphone sound data 99, and process data 100. Note that in addition to the data shown in FIG. 15, the main memory has stored therein data to be used in the game such as image data for objects appearing in the game and sound data.

The game program 90 is read in whole or in part from the optical disc 4 at an appropriate time after the power-on of the game apparatus 3, and then stored to the main memory. Note that the game program 90 may be acquired from the flash memory 17 or a device external to the game apparatus 3 (e.g., via the Internet), rather than from the optical disc 4. Moreover, a portion (e.g., a program for calculating the attitude of the controller 5 and/or the attitude of the terminal device 7) of the game program 90 may be prestored in the game apparatus 3.

The terminal operation data 91 is data representing the player's operation on the terminal device 7. The terminal operation data 91 is transmitted by the terminal device 7, acquired by the game apparatus 3, and then stored to the main memory. The terminal operation data 91 includes operation button data 92, stick data 93, touch position data 94, angular rate data 95, acceleration data 96, and azimuth data 97. Note that the main memory may have stored therein the terminal operation data up to a predetermined number of pieces counted from the latest piece (the last acquired piece).

The operation button data 92 is data representing an input state of each of the operation buttons 54A to 54L provided on the terminal device 7. Specifically, the operation button data 95 indicates whether any of the operation buttons 54A to 54L has been pressed.

The stick data 93 is data representing the direction and the amount of sliding (or tilting) of the stick portion of each of the analog sticks 53A and 53B. The amount and the direction may be represented by, for example, two-dimensional coordinates or a two-dimensional vector.

The touch position data 94 is data representing a position (touch position) on the input screen of the touch panel 52 at which an input has been made. In the present example embodiment, the touch position data 94 represents a coordinate value in a two-dimensional coordinate system which indicates a position on the input screen. Note that in the case where the touch panel 52 is multi-touch, the touch position data 94 may represent a plurality of touch positions.

The angular rate data 95 is data representing angular rates detected by the gyroscope 64. In the present example embodiment, the angular rate data 95 represents angular rates about three axes, x-, y-, and z-axes, shown in FIG. 8, but in another example embodiment, the data may represent an angular rate about each of any one or more axes.

The acceleration data 96 is data representing acceleration (acceleration vector) detected by the acceleration sensor 63. In the present example embodiment, the acceleration data 96 represents three-dimensional acceleration whose components are acceleration values associated with the directions of three axes, x-, y-, and z-axes, shown in FIG. 8, but in another example embodiment, the data may represent acceleration associated with any one or more directions.

The azimuth data 97 is data representing an azimuth detected by the magnetic sensor 62. In the present example embodiment, the azimuth data 97 represents a predetermined azimuth (e.g., north) with respect to the terminal device 7. Note that in a place where there is a magnetic field in addition to the geomagnetic field, the azimuth data 97 does not strictly indicate an absolute azimuth (such as north). However, the azimuth data 97 indicates the direction of the terminal device 7 relative to the direction of the magnetic field in the place, and therefore, even in the case as above, it is possible to calculate the attitude or the change in the attitude of the terminal device 7 based on the azimuth data 97.

Note that the terminal operation data 91 may include anyone of the data 92 to 97 so long as an operation on the terminal device 7 is represented. In addition, in the case where the terminal device 7 has another input means (e.g., a touch pad, or an imaging means as provided in the controller 5), the terminal operation data 91 may include data representing an operation on such an input means. Note that in the case where the motion of the terminal device 7 itself is used as a game operation as in the present example embodiment, the terminal operation data 91 may include data representing information related to the motion of the terminal device 7 (data whose value changes in accordance with the motion), as in the case of the acceleration data 96, the angular rate data 95, and the azimuth data 97. For example, the information related to the motion of the terminal device 7 is information concerning the position, attitude, change in position (speed), change in attitude (angular rate), acceleration, and angular acceleration of the terminal device 7.

The camera image data 98 is data representing an image (pickup image) obtained by the camera 56 of the terminal device 7. The camera image data 98 is image data obtained by the codec LSI 27 decompressing compressed image data transmitted by the terminal device 7, and the input/output processor 11a stores the camera image data 98 to the main memory. Note that the main memory may have stored therein the camera image data up to a predetermined number of pieces counted from the latest piece (the last acquired piece).

The microphone sound data 99 is data representing sound (microphone sound) detected by the microphone 69 of the terminal device 7. The microphone sound data 99 is obtained by the codec LSI 27 decompressing compressed sound data transmitted by the terminal device 7, and the input/output processor 11a stores the microphone sound data 99 to the main memory.

Furthermore, although not shown because the controller 5 is not used as an operating device in the present example embodiment, the main memory may have stored therein controller operation data representing the player's operation on the controller 5. Note that in another example embodiment, the controller 5 may be used for operation as well. For example, the controller 5 may be directed toward the terminal device 7 to perform an operation of specifying a coordinate point and thereby to produce an effect within the screen.

Figure 16:
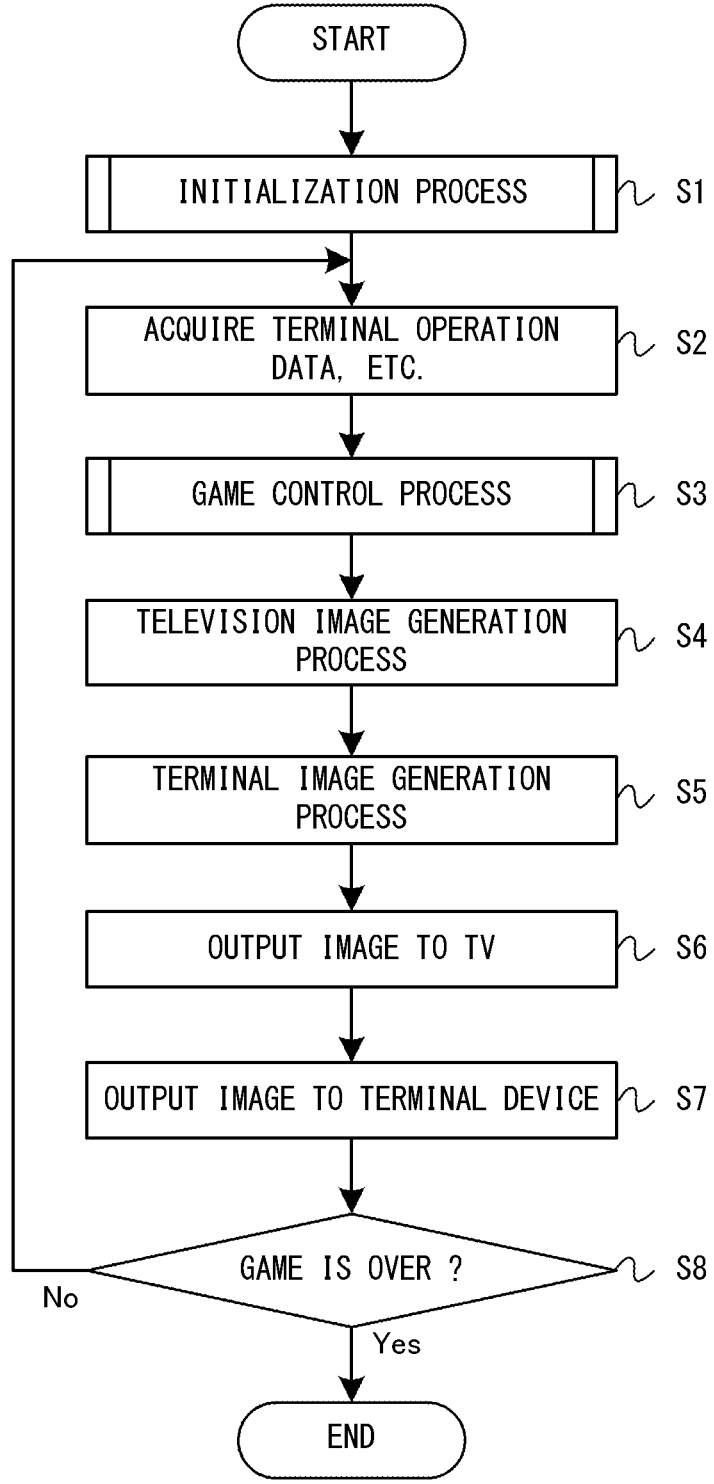
FIG. 16 is a main flowchart illustrating a flow of example game processing to be executed by a game apparatus 3.

The process data 100 is data to be used in game processing to be described later (FIG. 16). The process data 100 includes rendering plane data 101, terminal camera data 102, television camera data 103, image recognition data 104, sound recognition data 105, terminal behavior data 106, and object data 107. Note that in addition to the data shown in FIG. 15, the process data 100 includes various types of data for use in game processing, such as data representing various parameters set for various objects appearing in the game.

The rendering plane data 101 is data representing the position and the attitude of the rendering plane in the virtual space. The rendering plane is a plane on which a pickup image is rendered. Note that the rendering plane may take any arbitrary shape, and in the present example embodiment, the rendering plane is a flat plane equal in aspect ratio to the display screen of the LCD 51 in the terminal device 7. Moreover, the position and the attitude of the rendering plane may be controlled arbitrarily, and in the present example embodiment, the rendering plane is fixed in a predetermined position and attitude at the start of the game.

The terminal camera data 102 is data representing the position and the attitude of the terminal virtual camera. As described above, the position and the attitude of the terminal virtual camera are set in accordance with the position and the attitude of the rendering plane. Note that in the present example embodiment, the terminal virtual camera is fixed in a predetermined position and attitude at the start of the game, as in the case of the rendering plane.

The television camera data 103 is data representing the position and the attitude of the television virtual camera. As described above, the position and the attitude of the television virtual camera are set in accordance with the position and the attitude of the rendering plane, concretely, the television virtual camera is arranged at a position opposing the terminal virtual camera with respect to the rendering plane and in an attitude directed toward the rendering plane. Note that in the present example embodiment, the television virtual camera is fixed in a predetermined position and attitude at the start of the game, as in the case of the rendering plane.

The image recognition data 104 is data representing the result for image recognition processing performed on a pickup image. As will be described in detail later, the content of the image recognition processing may be arbitrary, and the content of information obtained as a processing result may be arbitrary as well. In the present example embodiment, the image recognition data 104 is generated by subjecting the camera image data 98 to image recognition processing.

The sound recognition data 105 is data representing the result for sound recognition processing performed on the microphone sound data. As will be described in detail later, the content of the sound recognition processing may be arbitrary, and the content of information obtained as a processing result may be arbitrary as well. In the present example embodiment, the sound recognition data 105 is generated by subjecting the microphone sound data 99 to sound recognition processing.

The terminal behavior data 106 is data representing the behavior of the terminal device 7. In addition to the position, attitude, speed, angular rate, acceleration, angular acceleration, etc., of the terminal device 7, the terminal behavior data 106 represents, for example, whether or not the terminal device 7 has moved in a predetermined manner (more specifically, whether or not the terminal device 7 has been shaken) and whether or not the terminal device 7 has been oriented in a predetermined direction. In the present example embodiment, the terminal behavior data 106 is calculated on the basis of the angular rate data 95 or the acceleration data 96.

The object data 107 is data representing the state of the object 81 (midget object) arranged in the virtual space. For example, the object data 107 represents the position, direction, action, etc., of the object 81. The object 81 may be controlled arbitrarily, and in the present example embodiment, the object 81 is controlled by an operation using the terminal device 7, i.e., the terminal operation data 91. That is, by operating the terminal device 7, the player can produce some effect on the object 81 in the virtual space.

Next, the game processing to be executed by the game apparatus 3 will be described in detail with reference to FIGS. 16 to 18. FIG. 16 is a main flowchart illustrating a flow of the game processing to be executed by the game apparatus 3. When the game apparatus 3 is powered on, the CPU 10 of the game apparatus 3 executes a boot program stored in an unillustrated boot ROM, thereby initializing each unit, including the main memory. The game program stored in the optical disc 4 is loaded to the main memory, and the CPU 10 starts executing the game program. The processing shown in the flowchart of FIG. 16 is performed upon completion of the above processing. Note that the game apparatus 3 may be configured such that the game program is executed immediately after the power-on or such that an internal program for displaying a predetermined menu screen is initially executed after the power-on and then the game program is executed, for example, when the player provides an instruction to start the game by performing a selection operation on the menu screen.

Figure 17:
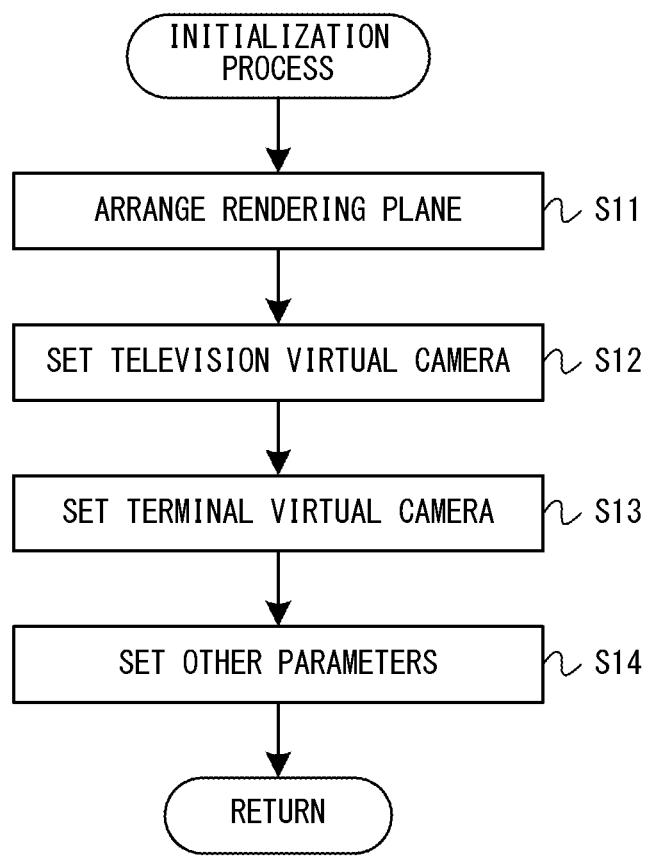
FIG. 17 is a flowchart illustrating a detailed flow of an example initialization process (step S1) shown in FIG. 16.
Figure 18:
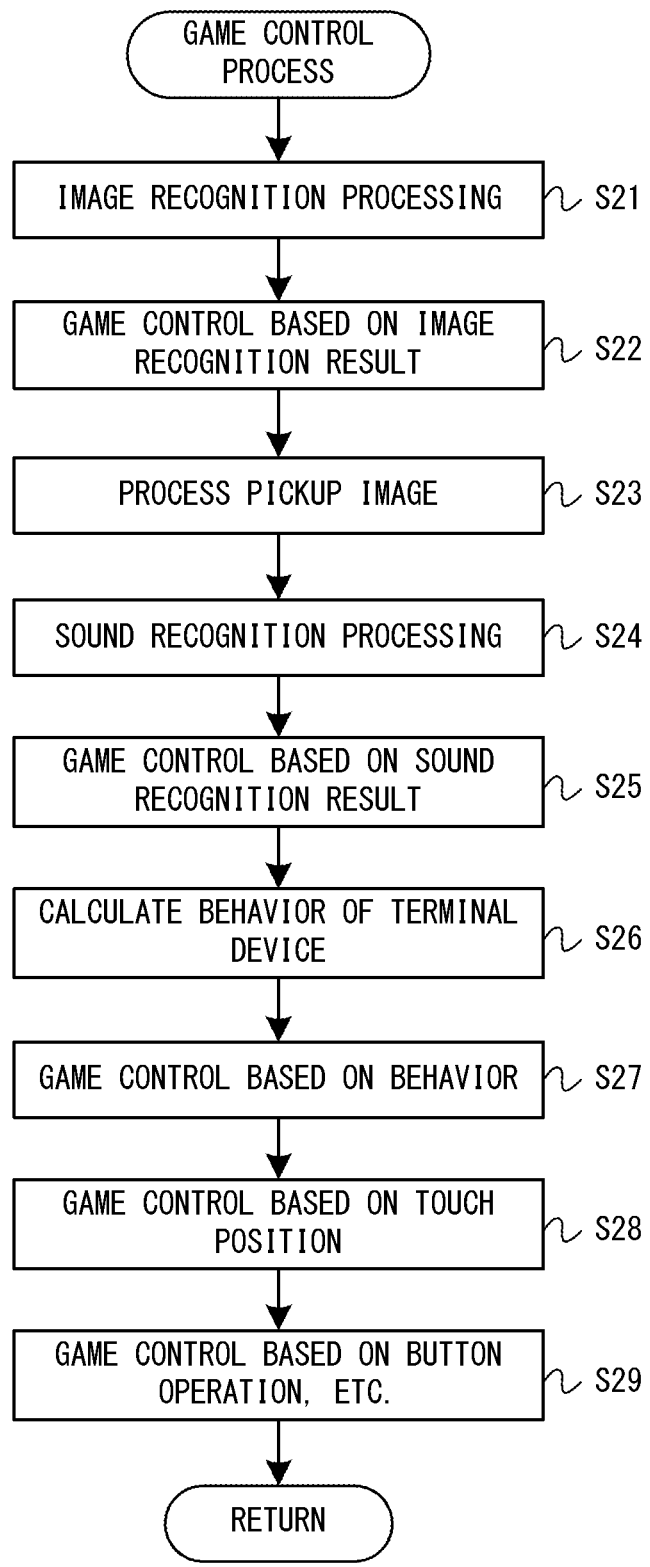
FIG. 18 is a flowchart illustrating a detailed flow of an example game control process (step S3) shown in FIG. 16.

Note that the processing in each step of the flowcharts shown in FIGS. 16 to 18 (and also FIGS. 19 and 21) is merely illustrative, and if similar results can be achieved, the processing order of the steps may be changed. In addition, values of variables and thresholds to be used in determination steps are also merely illustrative, and other values may be used appropriately. Furthermore, while the processing in each step of the flowcharts is described in the present example embodiment as being performed by the CPU 10, the processing in the steps of the flowcharts may be performed in part by a processor other than the CPU 10 or by specialized circuits.

First, in step S1, the CPU 10 performs an initialization process. The initialization process is, for example, a process for constructing a virtual space, placing objects appearing in the game space at their initial positions, and setting initial values of various parameters to be used in the game processing. Hereinafter, the initialization process will be described in detail with reference to FIG. 17.

FIG. 17 is a flowchart illustrating a detailed flow of the initialization process (step S1) shown in FIG. 16. In the initialization process, first, in step S11, the CPU 10 arranges a rendering plane in a virtual space. Specifically, the CPU 10 constructs a virtual space (game space), and arranges a rendering plane within the virtual space. The rendering plane may be arranged arbitrarily, and in the present example embodiment, the rendering plane is arranged in a predetermined position and attitude. Concretely, a room 82 is constructed in the virtual space (see FIG. 13), and the rendering plane is arranged so as to correspond to an opening of the room 82. Data representing the position and the attitude of the arranged rendering plane is stored to the main memory as rendering plane data 101. Following step S11, the process of step S12 is performed.

In step S12, the CPU 10 sets a television virtual camera. The television virtual camera is set in accordance with the position and the attitude of the rendering plane. In the present example embodiment, the television virtual camera is arranged at a position on one side of the rendering plane and in an attitude directed toward the rendering plane. More specifically, the CPU 10 sets the position and the attitude of the television virtual camera such that the rendering plane can be viewed from the side on which a pickup image is rendered. As a result, the range of the television virtual camera's field of view includes a portion of the virtual space that includes the side on which the pickup image is rendered, so that an image of the virtual space synthesized with the pickup image can be readily generated. In addition, such an image can be generated as if the virtual space were connected to the real space represented by the pickup image. Data representing the position and the attitude of the television virtual camera is stored to the main memory as television camera data 103. Note that the data representing the position and the attitude of the television virtual camera may be prepared along with the game program 90, or may be calculated on the basis of the position and the attitude of the rendering plane arranged in step S11. Following step S12, the process of step S13 is performed.

In step S13, the CPU 10 sets a terminal virtual camera. The terminal virtual camera is set in accordance with the position and the attitude of the rendering plane. In the present example embodiment, the terminal virtual camera is arranged at a position on the other side of the rendering plane (the side being opposite to the television virtual camera) and in an attitude directed toward the rendering plane. More specifically, the CPU 10 sets the position and the attitude of the terminal virtual camera such that the rendering plane can be viewed from the opposite side to the side on which a pickup image is rendered. As a result, the terminal virtual camera is set in an approximately opposite direction to the television virtual camera with respect to a predetermined plane (rendering plane) within the virtual space (see FIG. 13). In addition, while the terminal image does not include the pickup image, the television image includes the pickup image, and therefore, the terminal image can be appropriately consistent with the television image, making it possible to render the virtual space more real. Note that the terminal virtual camera may be set with the line-of-sight direction perpendicular to the rendering plane. As a result, the line-of-sight direction of the player viewing the screen of the terminal device 7 can be matched with the line-of-sight direction in the terminal image, so that the terminal device 7 can display the virtual space more naturally. Data representing the position and the attitude of the terminal virtual camera is stored to the main memory as terminal camera data 102. Note that the data representing the position and the attitude of the terminal virtual camera may be prepared along with the game program 90, or may be calculated on the basis of the position and the attitude of the rendering plane arranged in step S11. Following step S13, the process of step S14 is performed.

In step S14, the CPU 10 sets initial values of other parameters. Note that these other parameters include parameters other than the parameters related to the rendering plane and the virtual cameras. These other parameters may be any parameters, and include, for example, parameters representing initial states of various objects, including the object 81. After step S14, the CPU 10 ends the initialization process.

Following the initialization process (step S1), the process of step S2 is performed. Thereafter, a process loop including a series of processing in steps S2 to S8 is repeatedly performed once per a predetermined period of time (e.g., one frame period or 1/60 of a second).

In step S2, the CPU 10 acquires data from the terminal device 7. Here, the camera image data is at least acquired from the terminal device 7, and in the present example embodiment, the terminal operation data and the microphone sound data are additionally acquired. The terminal device 7 repeatedly transmits data (the terminal operation data, the camera image data, and the microphone sound data) to the game apparatus 3, and therefore, the game apparatus 3 sequentially receives the data. Specifically, in the game apparatus 3, the terminal communication module 28 sequentially receives the data, and the codec LSI 27 sequentially subjects the camera image data and the microphone sound data to a decompression process. Then, the input/output processor 11a sequentially stores the terminal operation data, the camera image data, and the microphone sound data to the main memory. The CPU 10 reads the data from the main memory at appropriate times. Following step S2, the process of step S3 is performed.

In step S3, the CPU 10 starts a game control process. For example, the game control process is a process for performing processing to control an object on the basis of the player's operation. Hereinafter, referring to FIG. 18, the game control process will be described in detail.

FIG. 18 is a flowchart illustrating a detailed flow of the game control process (step S3) shown in FIG. 16. In the game control process, the CPU 10 initially in step S21 performs image recognition processing on the pickup image. The image recognition processing is intended to extract some characteristic from the pickup image and calculate information related to the extracted characteristic, but the details of the processing may be arbitrary. In the present example embodiment, the image recognition processing may be processing for recognizing the player's face. More specifically, the image recognition processing may produce processing results as mentioned above by calculating the positions of the player's face, eyes, and mouth, and by determining the player's expression (whether the player is smiling or talking, or the player has blinked), or the image recognition processing may be processing for conducting a personal verification (to identify the player from among registrants). Alternatively, the image recognition processing may be processing for recognizing the player's part other than face, or may be processing for determining the brightness level around the player. In step S21, the CPU 10 reads the camera image data 98 from the main memory, and performs the image recognition processing on the pickup image. Note that in the present example embodiment, pickup images are sequentially acquired (received) from the terminal device 7, and the sequentially acquired pickup images are targeted for the image recognition processing. Data representing the results for the image recognition processing is stored to the main memory as image recognition data 104. Following step S21, the process of step S22 is performed.

In step S22, the CPU 10 performs game control processing to add a change to the virtual space on the basis of the result for the image recognition processing. The content of the game control processing may be arbitrary so long as some change is added to the virtual space, e.g., the action of an object arranged in the virtual space may be controlled, or the condition (e.g., weather, time, or geography) of the virtual space may be changed. In the present example embodiment, the CPU 10 may control the action of the midget object 81 on the basis of the results for the image recognition processing.

Concretely, the object 81 may be caused to move in accordance with the player's eye position, so as to follow the player's line-of-sight direction, or the object 81 may be caused to perform a predetermined action in accordance with the player's expression (e.g., the expression of the object 81 may be changed in accordance with the player's expression). Alternatively, the CPU 10 may change the virtual space between day and night (brightness levels) in accordance with the brightness level around the player. Concretely, in the process of step S22, the CPU 10 reads the image recognition data 104 from the main memory, and adds a change to the virtual space on the basis of the results for the image recognition processing. Data representing the condition of the virtual space after the change is stored to the main memory. Following step S22, the process of step S23 is performed.

In the present example embodiment, some change is added to the virtual space on the basis of the results for the image recognition processing on the pickup image, as in the processes of steps S21 and S22. Accordingly, the player can perform a game operation by changing the subject of an image obtained by the camera 56. For example, the player can perform a game operation by changing his/her facial expression or by moving with respect to the camera 56.

In step S23, the CPU 10 performs predetermined image processing on the pickup image. The image processing is, for example, processing for modifying the pickup image to obtain a suitable image to be displayed on the television 2, and the content of the image processing may be arbitrary. In the present example embodiment, the pickup image may be processed to extract (clip) a portion to be used for generating the television image. Specifically, the television image may be generated by synthesizing an image of the virtual space with at least a portion of the pickup image. For example, the CPU 10 extracts an area of the pickup image in accordance with the positional relationship between the screen of the terminal device 7 and the camera 56. Here, the camera 56 is provided around the screen of the LCD 51, and therefore, the viewpoint to see the real space from the position of the camera 56 slightly differs from the viewpoint to see the real space from the position of the screen. Accordingly, without modification, the pickup image might be unnatural as an image of the real space as viewed from the position of the screen. Concretely, in the present example embodiment, the camera 56 is provided above the LCD 51, and therefore, in the case of the real space as viewed from the position of the screen, even if the player is positioned in front of the screen, the pickup image displays the player slightly below the center, and therefore, without modification, the player might perceive the pickup image to be unnatural. In this case, the CPU 10 may extract a portion of the pickup image that centers on a position slightly below the center of the pickup image (an upper portion of the pickup image may be deleted). As a result, the pickup image can be processed to be more natural as an image of the real space as viewed from the position of the screen.

Furthermore, in addition to (or instead of) performing the above process, the CPU 10 may extract a predetermined area of the pickup image such that the pickup image is equal in aspect ratio to the screen (or the rendering plane) of the LCD 51 in the terminal device 7. Moreover, in addition to (or instead of) the extraction as described above, the predetermined image processing may include image enlargement/reduction, change of color and/or brightness, etc. For example, in the case where a predetermined target (e.g., the player's face) is recognized by the image recognition processing, image enlargement/reduction processing may be performed such that the recognized target has a predetermined size. Moreover, for example, the pickup image may be processed to have its brightness changed in accordance with the brightness in the virtual space. In addition, the predetermined image processing may include, for example, extracting a predetermined target area from the pickup image or adding predetermined effect to the pickup image, as in a variant to be described later.

Concretely, in the process of step S23, the CPU 10 reads the camera image data 98 from the main memory, and performs the predetermined image processing on the pickup image. Thereafter, data for the processed pickup image to the main memory. Note that in a television image generation process (step S4) to be described later, a television image is generated using the processed pickup image. Moreover, in the present example embodiment, pickup images are sequentially acquired in the process of step S2, and then subjected to the predetermined image processing. As a result, the pickup images included in the television image change sequentially, and displayed on the television 2 as moving images. Following step S23, the process of step S24 is performed.

In step S24, the CPU 10 performs sound recognition processing on the microphone sound data. The sound recognition processing is intended to extract some characteristic from the microphone sound data and calculate information related to the extracted characteristic, but the details of the processing may be arbitrary. For example, the sound recognition processing may recognize the player's voice and identify a command spoken by the player, or may determine the player's breath (more specifically, whether or not the player has exhaled a breath or the strength of exhalation). Moreover, the sound recognition processing is not limited to the processing for recognizing sound (speech or breath) made by the player, and may be the processing for recognizing any event or effect produced by the player, rather than sound. In step S24, the CPU 10 reads the microphone sound data 99 from the main memory, and performs the aforementioned sound recognition processing on the microphone sound data. Data representing the result for the sound recognition processing is stored to the main memory as sound recognition data 105. Following step S24, the process of step S25 is performed.

In step S25, the CPU 10 performs game control processing to add a change to the virtual space on the basis of the result for the sound recognition processing. As in the case of step S22, the content of the game control processing may be arbitrary so long as some change is added to the virtual space. In the present example embodiment, the CPU 10 controls the action of the midget object 81 in accordance with the spoken command identified by the sound recognition processing (e.g., the midget object 81 is caused to perform a running action in accordance with a spoken command "Run"). Alternatively, the CPU 10 may cause wind to blow in the virtual space in accordance with the player's breath (and further, may cause the wind to blow away the midget object 81). Concretely, in the process of step S25, the CPU 10 reads the sound recognition data 105 from the main memory, and adds a change to the virtual space on the basis of the result for the sound recognition processing. Data representing the condition of the virtual space after the change (the object data 107 may be included) is stored to the main memory. Following step S25, the process of step S26 is performed.

In the present example embodiment, some change is added to the virtual space on the basis of data for sound detected by the microphone (microphone sound data 99), as described in conjunction with the processes of steps S24 and S25. Accordingly, the player can perform a game operation by providing an input to the microphone 69. For example, the player can perform a game operation by speaking a command or exhaling a breath onto the microphone 69.

In step S26, the CPU 10 calculates the behavior of the terminal device 7. The behavior of the terminal device 7 is calculated on the basis of motion data representing information on the motion of the terminal device. Any specific information may be calculated as the behavior, and any data may be used as the motion data for calculating the behavior. In the present example embodiment, for example, the attitude (tilt) of the terminal device 7 may be calculated using the angular rate data 95 and the acceleration data 96. Note that a change in the attitude of the terminal device 7 per unit time can be known from the angular rate data 95, and therefore, the attitude of the terminal device 7 can be calculated on the basis of the angular rate data 95. In addition, when the terminal device 7 is in approximately static state, the attitude of the terminal device 7 with respect to the direction of gravity can be known, and therefore, it is possible to calculate the attitude of the terminal device 7 on the basis of the acceleration data 96 or correct an attitude calculated on the basis of the angular rate data 95 using the acceleration data 96. Note that the attitude of the terminal device 7 can also be calculated on the basis of the azimuth data 97.

Furthermore, in step S26, for example, information representing whether the terminal device 7 has been shaken or not may be calculated using the acceleration data 96. Specifically, when the terminal device 7 has been shaken, the acceleration represented by the acceleration data 96 is repeatedly changed between opposite directions, and therefore, by sensing such a change, the aforementioned information can be calculated.

Concretely, in the process of step S26, the CPU 10 reads the angular rate data 95 and the acceleration data 96 acquired in step S2 from the main memory, and calculates the attitude of the terminal device 7 on the basis of the angular rate and the acceleration. In addition, information representing whether the terminal device 7 has been shaken or not is calculated based on the acceleration. Data representing the calculated attitude and information is stored to the main memory as terminal behavior data 106. Following step S26, the process of step S27 is performed.

In step S27, the CPU 10 performs game control processing for adding a change to the virtual space on the basis of the behavior of the terminal device 7. The game control processing may be any processing for adding some change to the virtual space as in step S22. In the present example embodiment, the CPU 10 performs processing for moving the virtual space (room 82) in accordance with the behavior (motion) of the terminal device 7. Concretely, the CPU 10 may change the attitude of the room 82 in accordance with the attitude of the terminal device 7 (e.g., the attitude with respect to rotation about an axis perpendicular to the screen) or may shake the room 82 in accordance with the terminal device 7 being shaken. Moreover, the action of the midget object 81 may be controlled in accordance with the change in the room 82, e.g., the midget object 81 may slip when the room 82 is tilted a certain degree or more or may lose a balance in accordance with the room 82 being shaken. Note that when the room 82 is moved in a manner as described above, the virtual cameras may be controlled so as not to change their positional relationship with the room 82, or the virtual cameras may be fixed. In addition, as in a variant to be described later, the position and the attitude of the rendering plane may be controlled based on the behavior (attitude) of the terminal device 7, and further, the virtual cameras may be set on the basis of the position and the attitude of the rendering plane. Concretely, in the process of step S27, the CPU 10 reads the terminal behavior data 106 from the main memory, and adds a change to the virtual space on the basis of the behavior of the terminal device 7. Data representing the state of the changed virtual space is stored to the main memory. Following step S27, the process of step S28 is performed.

In step S28, the CPU 10 performs game control processing for adding a change to the virtual space on the basis of a touch position. The game control processing may be any processing for adding some change to the virtual space as in step S22. In the present example embodiment, the CPU 10 controls the action of an object arranged at a position in the virtual space that corresponds to the touch position. For example, the CPU 10 may cause the midget object 81 to perform an action of turning to the player (the rendering plane) in response to an input being made by touching the position of the midget object 81 on the screen. In addition, for example, when an input is provided by drawing a line on the touch panel 52, an object arranged at a position in the virtual space that corresponds to the touch position may be caused by the CPU 10 to move along the line. Note that the game control processing in step S28 is not limited to the control processing for an object arranged at a position in the virtual space that corresponds to a touch position, and for example, the CPU 10 may cause the midget object 81 to perform an action of turning to the player in accordance with an input being made at any position on the screen. Concretely, in the process of step S28, the CPU 10 reads the touch position data 94 from the main memory, and adds a change to the virtual space on the basis of the touch position. Data representing the state of the changed virtual space is stored to the main memory. Following step S28, the process of step S29 is performed.

In step S29, the CPU 10 performs game control processing for adding a change to the virtual space on the basis of an operation on any operation member provided in the terminal device 7 (any of the analog sticks 53A and 53B and the buttons 54A to 54L). The game control processing may be any processing for adding some change to the virtual space as in step S22. For example, the CPU 10 may cause a predetermined object arranged in the virtual space to move in a direction inputted with the analog stick 53 or the cross button 54A. Alternatively, when a cursor for selecting an object within the virtual space is displayed on the screen of the LCD 51, the CPU 10 may move the cursor in accordance with the inputted direction. Concretely, in the process of step S29, the CPU 10 reads the operation button data 92 and/or the stick data 93 from the main memory, and adds a change to the virtual space on the basis of an operation on any operation member. Data representing the state of changed virtual space is stored to the main memory. After step S29, the CPU 10 ends the game control process shown in FIG. 18.

As described above, in the present example embodiment, operation data (terminal operation data) representing the player's operation on the terminal device 7 is transmitted to the game apparatus 3, and the CPU 10 performs game control processing for adding a change to the virtual space on the basis of the operation data (steps S26 to S29). As a result, the player can perform various game operations using the terminal device 7. In addition, the player can add changes to the virtual space by the game operations, thereby communicating with the midget object 81 in various manners. Thus, the present example embodiment can provide a game to be played to communicate with a midget in various manners as if the midget existed in the terminal device 7.

Furthermore, when the operation data on the basis of which game control processing is performed is motion data (angular rate data 95 and acceleration data 96) representing information on the motion of the terminal device 7 (step S27), the player can perform a game operation by simply moving the terminal device 7, so the game operation is intuitive and easy to perform. Moreover, in the present example embodiment, the processing for moving the virtual space is performed in accordance with the motion of the terminal device 7, and therefore, by performing an operation of moving the terminal device 7, the player can feel as if he/she were actually moving the virtual space. Thus, the virtual space can appear more real.

Furthermore, when the operation data on the basis of which game control processing is performed is data (touch position data 94) for an input position on the screen of the display section (LCD 51) in the terminal device 7 (step S28), the player can perform a game operation by directly touching the virtual space displayed on the screen, so the game operation is intuitive and easy to perform. Moreover, in the present example embodiment, the action of an object arranged at a position in the virtual space that corresponds to a touch position is controlled, and therefore, by performing an operation of touching the screen, the player can feel as if he/she were actually touching the virtual space. Thus, the virtual space can appear more real.

Furthermore, when the operation data on the basis of which game control processing is performed is operation data (operation button data 92 and/or stick data 93) representing the player's operation on any operation member of the terminal device 7 (step S29), the player can readily perform a game operation with the terminal device 7 in hand.

Returning to the description of FIG. 16, the process of step S4 is performed after the game control process in step S3. In step S4, a television image is generated. Specifically, the CPU 10 and the GPU 11b collaborate to read data representing the result for the game control process in step S3 (e.g., the rendering plane data 101, the camera data 102 and 103, and the object data 107) from the main memory, and also data for use in television image generation from the VRAM 11d, and generates the television image using the data being read.

Here, the CPU 10 generates a television image by synthesizing a pickup image (at least in part) with an image of the virtual space as viewed from the television virtual camera (FIG. 12). Specifically, when generating a television image, the CPU 10 reads pickup image data from the main memory, along with data representing the result for the game control process, and the CPU 10 and the GPU 11b collaborate to generate the television image using the pickup image data. Accordingly, the television image is made as an image of the real space as viewed from the virtual space. Moreover, in the present example embodiment, the television image includes the pickup image at the position of the rendering plane. Therefore, the television image appears as if the virtual space and the real space were connected by the rendering plane. Note that in the present example embodiment, the pickup image for use in television image generation is subjected to the image processing in step S23. Accordingly, when generating a television image, the CPU 10 reads data for a processed pickup image from the main memory, along with data representing the result for the game control process, and the CPU 10 and the GPU 11b collaborate to generate a television image using the data. In the present example embodiment, television images are sequentially generated using pickup images sequentially acquired in step S2. That is, the process of step S4 is repeatedly performed so that pickup images included in the television images are displayed as moving images. Thus, the television images can appear more real. Note that in another example embodiment, the pickup images included in the television images may be still images. Specifically, television images may be sequentially generated while a pickup image acquired at a certain point is continuously used for a predetermined period. Alternatively, pickup images for use in television image generation may be updated at predetermined time intervals.

Furthermore, in the present example embodiment, the pickup image is rendered on the plane (rendering plane) 85 arranged in the virtual space. That is, in the present example embodiment, by using the rendering plane arranged in the virtual space, a television image is generated with a pickup image being synthesized with an image of the virtual space. Concretely, in step S4, the CPU 10 (in collaboration with the GPU 11b) renders a pickup image on the rendering plane (the pickup image being attached to the rendering plane as a texture), thereby generating an image of the virtual space including the rendering plane. As a result, the image of the virtual space is synthesized with the pickup image, so that the television image can be readily generated with the pickup image at the position of the rendering plane.

Figure 19:
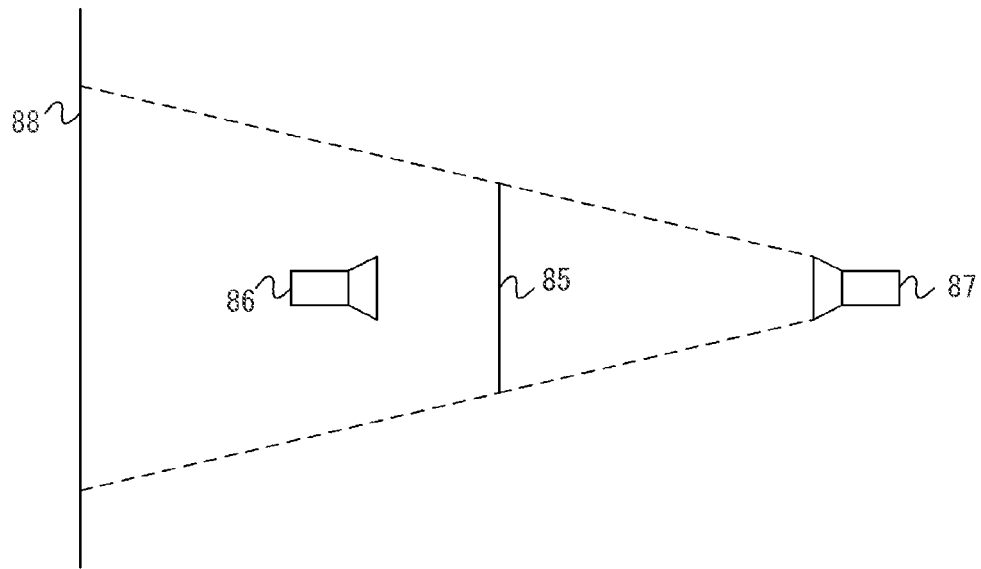
FIG. 19 is a diagram illustrating an example of the method for rendering a pickup image in another example embodiment.

Note that in another example embodiment, the plane on which to render the pickup image is not always the plane 85. FIG. 19 is a diagram illustrating the method for rendering the pickup image in another example embodiment. In FIG. 19, a background plane 88 is arranged behind the plane 85 when viewed from the television virtual camera 87 (note that either of the background plane 88 or the terminal virtual camera 86 can be arranged in front of the other). In this case, the pickup image may be rendered on the background plane 88. However, in the case where the pickup image is rendered on the background plane 88, when the position or attitude of the television virtual camera 87 changes, the position at which to render the pickup image may be changed in accordance with the television virtual camera 87. On the other hand, in such an example embodiment, the television image generation process can be performed more readily.

By the aforementioned processing in step S4 of the present example embodiment, an image as viewed when looking out of the opening of the room 82 arranged in the virtual space (FIG. 12) is generated as a television image. The generated television image is stored to the VRAM 11d. Following step S4, the process of step S5 is performed.

In step S5, a terminal image is generated. Specifically, the CPU 10 and the GPU 11b collaborate to read data representing the result for the game control process in step S3 from the main memory, and also data for use in terminal image generation from the VRAM 11d, and generate a terminal image. The generated terminal image is then stored to the VRAM 11d. Here, the CPU 10 generates as the terminal image an image of the virtual space as viewed from a terminal virtual camera different from the television virtual camera. Concretely, in the present example embodiment, an image as viewed when looking into the room 82 arranged in the virtual space from outside via the opening is generated as the terminal image (see FIG. 11). Note that in this case, the terminal image is generated assuming that the rendering plane is not present (or is transparent). In this manner, the terminal image is generated as an image of the virtual space as viewed from the real space. Thus, the virtual space can appear more real, such that the player viewing the television image and the terminal image feels as if the virtual space were actually present. Following step S5, the process of step S6 is performed.

In step S6, the CPU 10 outputs the television image to the television 2. Concretely, the CPU 10 transfers television image data stored in the VRAM 11d to the AV-IC 15. Then, the AV-IC 15 outputs the television image data to the television 2 via the AV connector 16. As a result, the television image is displayed on the television 2. Moreover, in step S6, game sound data may be outputted to the television 2, along with game image data, so that the speakers 2a of the television 2 output game sound. Following step S6, the process of step S7 is performed.

In step S7, the CPU 10 outputs (transmits) the terminal image to the terminal device 7. Concretely, the CPU 10 transfers the terminal image data stored in the VRAM 11d to the codec LSI 27, and the codec LSI 27 subjects the image data to a predetermined compression process. The terminal communication module 28 transmits the compressed image data to the terminal device 7 via the antenna 29. The terminal device 7 receives the image data transmitted by the game apparatus 3 at the wireless module 70, and the codec LSI 66 subjects the received image data to a predetermined decompression process. The decompressed image data is outputted to the LCD 51. As a result, the terminal image is displayed on the LCD 51. Moreover, in step S7, game sound data may be transmitted to the terminal device 7, along with game image data, so that the speakers 67 of the terminal device 7 output game sound. Following step S7, the process of step S8 is performed.

In step S8, the CPU 10 determines whether or not to end the game. The determination of step S8 is made on the basis of, for example, whether or not the player has provided an instruction to stop the game. When the result of the determination of step S8 is negative, the process of step S2 is performed again. On the other hand, when the result of the determination of step S8 is affirmative, the CPU 10 ends the game processing shown in FIG. 16. Note that when ending the game processing, a process of, for example, saving game data to a memory card or suchlike may be performed. Thereafter, a series of processing in steps S2 to S8 is repeatedly performed until the determination of step S8 indicates that the game is to be ended.

As described above, in the game processing of the present example embodiment, an image (television image) is generated (step S4) by synthesizing a pickup image at least in part with an image of a predetermined virtual space as viewed from a virtual camera (television virtual camera), and a predetermined display device (television 2) displays the generated image (step S6). In addition, an image (terminal image) of the virtual space as viewed from a virtual camera (terminal virtual camera) different from the television virtual camera is generated and displayed on the terminal device 7 (step S5). As a result, the predetermined display device displays an image of the real space as viewed from the virtual space, and the terminal device 7 displays an image of the virtual space as viewed from the real space. Accordingly, by presenting these images to the player, the player can feel as if the virtual space were connected to the real space, and therefore, the player can perceive the virtual space to be more real.

[7. Variants]

The above example embodiment is merely illustrative, and in another example embodiment, for example, the game system can be carried out with, for example, a configuration as described below.

(Variant Related to the Setting of the Plane and the Virtual Cameras)

In the above example embodiment, the plane (rendering plane) 85 and the virtual cameras 86 and 87 are arranged and fixed within the virtual space. Here, in another example embodiment, the plane 85 and the virtual cameras 86 and 87 may or may not be fixed, and may be movable (under some condition). For example, movement of the plane 85 and the virtual cameras 86 and 87 may be controlled in accordance with the player's operation. Described below is a variant of the above example embodiment where the terminal virtual camera 86 moves in accordance with the player's operation, and the plane 85 and the television virtual camera 87 move correspondingly.

Figure 20:
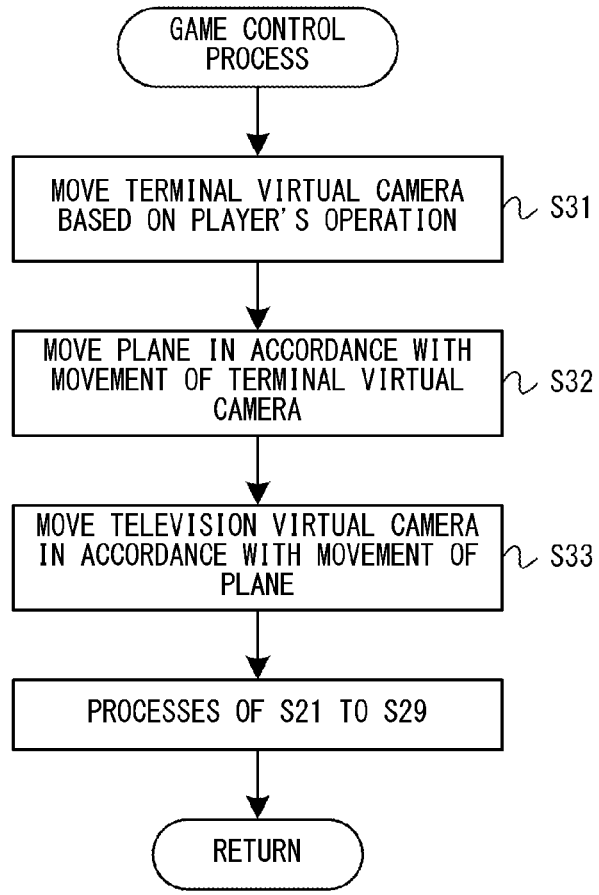
FIG. 20 is a flowchart illustrating a flow of an example game control process in a variant of the example embodiment.

FIG. 20 is a flowchart illustrating a flow of the game control process in a variant of the example embodiment. In the present variant, the processes of steps S31 to S33 are performed, and thereafter, the same series of processing in steps S21 to S29 as in the example embodiment (or a part thereof) is performed. Note that the processing of the present variant may be the same as the processing of the example embodiment except the game control process (step S3) shown in FIG. 16.

In step S31, the CPU 10 moves the terminal virtual camera 86 in accordance with the player's operation. Specifically, the CPU 10 sets the terminal virtual camera 86 on the basis of the terminal operation data 91 stored in the main memory. Movement of the terminal virtual camera 86 may be controlled arbitrarily, but in the present variant, for example, the terminal virtual camera 86 is controlled so as to move in accordance with a direction input operation performed on the terminal device 7. For example, the direction input operation may be an operation to orient the terminal device 7 in a vertically or horizontally tilted attitude or may be an operation to input a direction using the aforementioned operation member (e.g., the analog stick 53 or the cross button 54A).

Figure 21:
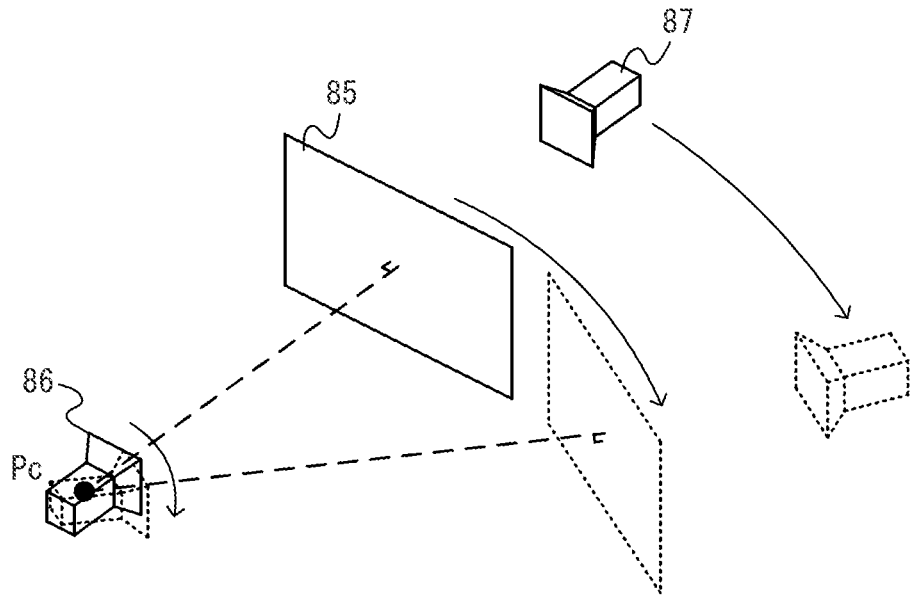
FIG. 21 is a diagram illustrating an example of the movement of a plane and virtual cameras.

FIG. 21 is a diagram illustrating an example of the movement of the plane 85 and the virtual cameras 86 and 87. In the example shown in FIG. 21, the terminal virtual camera 86 is controlled so as to rotate about a position at which the terminal virtual camera 86 is arranged. Note that in FIG. 21, since the terminal virtual camera 86 is arranged at the center of rotation, the terminal virtual camera 86 only changes its attitude, but in another example, the terminal virtual camera 86 may change both its position and attitude or may only change the position. Concretely, in the process of step S31, the CPU 10 reads the terminal operation data 91 from the main memory, and calculates a post-movement attitude of the terminal virtual camera 86 in accordance with the player's operation. Data representing the calculated attitude and a predetermined position is stored to the main memory as new terminal camera data 102. Following step S31, the process of step S32 is performed.

In step S32, the CPU 10 moves the plane 85 in accordance with the movement of the terminal virtual camera 86 (i.e., in accordance with the player's operation). Specifically, the CPU 10 calculates the position and the attitude of the plane 85 on the basis of the position and attitude of the terminal virtual camera 86 calculated in step S31. The movement of the plane 85 may be controlled arbitrarily, but in the present variant, the plane 85 is set so as to be included within the field-of-view range of the terminal virtual camera 86, concretely, the positional relationship between the plane 85 and the terminal virtual camera 86 remains unchanged before and after the movement of the plane 85. In the example shown in FIG. 21, the plane 85 rotationally moves as the terminal virtual camera 86 turns. Note that in the example shown in FIG. 21, the plane 85 changes its position and attitude, but in another example, only one of the position and the attitude may change. Concretely, in the process of step S32, the CPU 10 reads the terminal camera data 102 from the main memory, and calculates the position and the attitude of the plane 85 on the basis of the position and the attitude of the terminal virtual camera 86. Data representing the calculated position and attitude is stored to the main memory as new terminal camera data 102. Following step S32, the process of step S33 is performed.

In step S33, the CPU 10 moves the television virtual camera 87 in accordance with the movement of the terminal virtual camera 86 (i.e., in accordance with the player's operation). Specifically, the CPU 10 sets the television virtual camera 87 on the basis of the position and attitude of the terminal virtual camera 86 calculated in step S31. In the present variant, the television virtual camera 87 is set so as to include the plane 85 within its field-of-view range, concretely, the positional relationship between the terminal virtual camera 86 and the television virtual camera 87 remains unchanged before and after the movement of the television virtual camera 87. Accordingly, in the example shown in FIG. 21, the television virtual camera 87 rotationally moves as the terminal virtual camera 86 turns. Note that in the example shown in FIG. 21, the television virtual camera 87 changes its position and attitude, but in another example, only one of the position and the attitude may change. Concretely, in the process of step S33, the CPU 10 reads the television camera data 103 from the main memory, and calculates the position and the attitude of the television virtual camera 87 on the basis of the position and the attitude of the terminal virtual camera 86. Data representing the calculated position and attitude is stored to the main memory as new television camera data 103. In the present variant, the same series of processing in steps S21 to S29 as in the above example embodiment (or a part thereof) is performed after step S33.

As described above, in the present variant, the plane 85 and the virtual cameras 86 and 87 are set by the player's operation. Accordingly, the player can change an area of the virtual space that is to be displayed on the terminal device 7 or the television 2.

Note that both in the example embodiment and the variant, the two virtual cameras 86 and 87 are set so as to always satisfy the positional relationship in which the cameras 86 and 87 pick up their respective images of the plane 85 from opposite sides. Here, in another example embodiment, the virtual cameras 86 and 87 are not arranged so as to always satisfy such a positional relationship, but may satisfy the positional relationship at least when a predetermined condition is met. For example, the television virtual camera 87 may be set in accordance with the position and the direction of a predetermined object (e.g., the midget object 81). In this case, the virtual cameras 86 and 87 do not always satisfy the aforementioned positional relationship, but the positional relationship might be satisfied depending on the position and the direction of the predetermined object, and in such a case, effects similar to those achieved by the example embodiment can be achieved.

(Variant Related to the Game)

While the above example embodiment has been described taking as an example the game to be played to communicate with the midget object appearing in the virtual game space, the content of the game to be played with the game system 1 is arbitrary. For example, in another example embodiment, the game system 1 may be used for a multiplayer game to be simultaneously played by a plurality of players. Described below is game processing in a variant of the above example embodiment where a multiplayer game is executed.

In the present variant, the game system 1 includes an operating device capable of communicating with the game apparatus 3, and a player different from a player operating the terminal device 7 uses the operating device to perform game operations. The player who operates the terminal device 7 and the player who uses the operating device will be referred to below respectively as the "first player" and the "second player". In the present variant, the operating device is a controller 5, but in another example embodiment, the operating device may be any type of device. For example, in another example embodiment, the operating device may be the same model as the terminal device 7. In such a case, the terminal device 7 used as the second player's operating device may display a television image as described in the above example embodiment.

In step S2 of the present variant, the CPU 10 acquires controller operation data from the controller 5, in addition to various data from the terminal device 7. Specifically, the controller 5 repeatedly transmits controller operation data to the game apparatus 3, and the controller communication module 19 in the game apparatus 3 sequentially receives the controller operation data, which is in turn sequentially stored to the main memory by the input/output processor 11*a*. The CPU 10 reads the controller operation data from the main memory at appropriate times. Note that in the present variant, only one operating device (controller 5) is mentioned, but the game system 1 may include a plurality of operating devices, so the CPU 10 acquires operation data from each of the operating devices.

Figure 22:
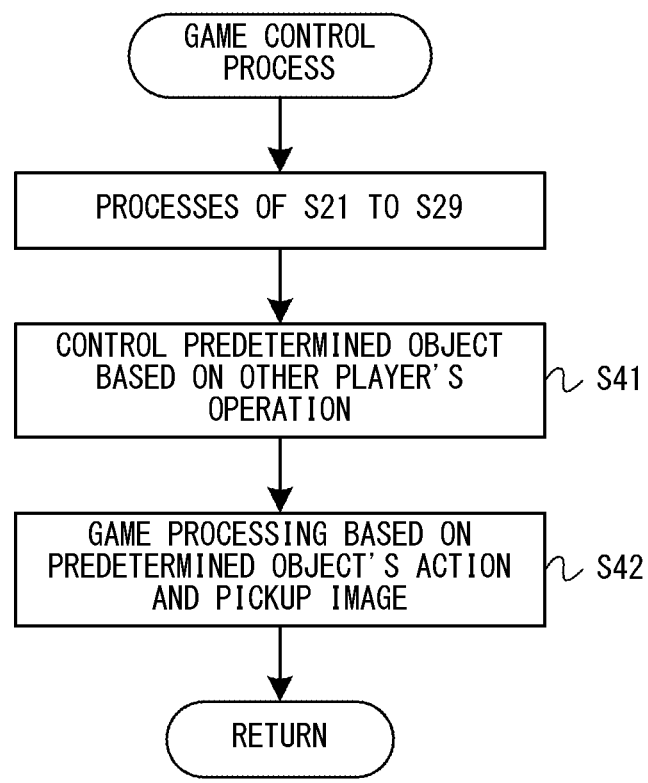
FIG. 22 is a flowchart illustrating a flow of an example game control process in another variant of the example embodiment.

FIG. 22 is a flowchart illustrating a flow of the game control process in the present variant. In the present variant, the processes of steps S41 and S42 are performed after the same series of processing in steps S21 to S29 as in the above example embodiment (or a part thereof).

In step S41, the CPU 10 controls a predetermined object on the basis of the second player's operation. Here, the predetermined object is the second player's operation target and is arranged in the virtual space. The predetermined object may be any arbitrary object. For example, in the above example embodiment, the midget object 81 may be operated by the second player as the predetermined object. Moreover, so long as the action of the predetermined object is controlled in accordance with an operation on the operating device (controller 5), the CPU 10 may use any specific control method. In the present variant, for example, the CPU 10 cause the predetermined object to move within the virtual space or perform a shooting action, in accordance with the operation on the controller 5. Concretely, in the process of step S41, the CPU 10 reads the controller operation data from the main memory, and controls the action of the predetermined object on the basis of the second player's operation. Thereafter, data for parameters representing the state of the controlled object (e.g., parameters representing the object's position and direction) is stored to the main memory. Following step S41, the process of step S42 is performed.

In step S42, the CPU 10 performs predetermined game processing on the basis of the action of the predetermined object and a pickup image rendered on the rendering plane (plane 85). The predetermined game processing may be any arbitrary processing so long as game progression is affected in some way, e.g., the processing may be a determination as to whether or not the pickup image has been affected in some way by the action of the predetermined object and, if affected, any change in game parameters due to the affected image is calculated. Concretely, in the present variant, the CPU 10 performs processing for determining whether or not any bullet fired by the predetermined object's shooting action has hit an area of the pickup image where the first player is displayed. Note that the area of the pickup image where the first player is displayed may be calculated, for example, in the image recognition processing of step S21. Moreover, when any bullet has hit the area, some points are added to the second player's score, or the first player's energy level is reduced. Concretely, in the process of step S42, the CPU 10 reads data for parameters representing the state of the predetermined object from the main memory, along with the image recognition data 104, and performs the predetermined game processing on the basis of the data being read. Thereafter, data representing the result for the predetermined game processing is stored to the main memory. At this time, in the processes for generating television and terminal images (steps S4 and S5), the data representing the result is referenced to generate the images. After step S42, the CPU 10 ends the game control process. Note that in the present variant, the processes of steps S4 to S8 subsequent to the game control process (step S3) may be the same as in the above example embodiment.

In the present variant, the virtual space can be made more real as in the above example embodiment, even in the case of the multiplayer game. Moreover, the game processing (step S42) is performed on the basis of a pickup image and the action of the predetermined object operated by the second player, so that each player can feel as if the real space were affected by the object within the virtual space. Concretely, in the above variant, the object within the virtual space can be perceived as if it shot the first player (operating the terminal device 7) in the real space. Thus, the players can strongly feel as if the virtual space were connected to the real space, so the virtual space can appear more real.

Note that in another example embodiment, the predetermined object may be (automatically) controlled by the CPU 10 in step S42 rather than operated by the second player. Even in such a case, as in the above variant, the players can feel as if the real space were affected by the object within the virtual space, so the virtual space can appear more real.

The game system 1 in which the player performs game operations using the terminal device 7 has been described in the above example embodiment as an example of the information processing system for displaying the virtual space on the screen. Here, in another example embodiment, the information processing system is intended for purposes including, but not limited to, game use, and may be applied to any arbitrary information processing systems or devices for displaying virtual spaces on display devices.

(Variant Related to the Player Object)

In the game of the above example embodiment, the player operating the terminal device 7 communicates with the object within the virtual space, and therefore, the player has no corresponding object arranged in the virtual space. On the other hand, in another example embodiment, a player object corresponding to the player might be arranged in the virtual space. The player object may be an object arranged at any arbitrary position in the virtual space and caused to move by the player's operation or may be an object arranged at the position of an image of the player rendered on the rendering plane.

(Variant Related to Pickup Image Display)

In the above example embodiment, a predetermined portion of a pickup image obtained by the camera 56 is displayed on the television 2 as a part of the television image. Here, in another example embodiment, the pickup image obtained by the camera 56 may be displayed at least in part on the television 2 as a part of the television image, and may be appropriately processed in accordance with the content of the game. For example, in the image recognition processing of step S21, the CPU 10 may extract the area of the player's image from the pickup image, and display the extracted image area on the television 2. In this case, the extracted image area may be rendered on a plane (e.g., the rendering plane or the background plane) arranged in the virtual space. As a result, the player can feel as if he/she were in the virtual space, so the virtual space can appear more real. Moreover, for example, in the case where a space in a water tank (a space in water) is generated and displayed on the terminal device 7 and the television 2 as a virtual space, the CPU 10 may subject the pickup image to, for example, distortion processing such that the image appears as if it were viewed from the inside of the water tank. As a result, the image of the real space displayed on the television 2 as viewed from the virtual space can appear more real, so the virtual space can be perceived to be more real.

(Variant Related to the Configuration of the Game System)

In the above example embodiment, the game system 1 is configured to include the game apparatus 3, the terminal device 7 provided with the image pickup section (camera 56) and the display section (LCD 51), and the predetermined display device (television 2). Here, the game system 1 may be configured arbitrarily so long as two images are generated, one being displayed on the terminal device, the other on the predetermined display device. For example, the game system 1 may be provided in a form not including the predetermined display device or in a form including a predetermined display device which is the same model as the terminal device 7.

Furthermore, the game system 1 is not always realized by a plurality of devices and may be realized by a single device. For example, the game system may be realized by a hand-held information processing apparatus (or game apparatus) provided with one image pickup section and two display sections. In this case, the information processing apparatus has the terminal image as in the example embodiment displayed on one display section and the television image as in the example embodiment on the other display section.

(Variant Related to the Information Processing Apparatus for Executing the Game Processing)

In the above example embodiment, a series of game processing to be performed in the game system 1 is executed by the game apparatus 3, but the series of game processing may be executed in part by another device. For example, in another example embodiment, a part (e.g., the terminal game image generation process) of the series of game processing may be executed by the terminal device 7. Moreover, in another example embodiment, a series of game processing in an input system including a plurality of information processing apparatuses capable of communicating with each other may be shared between the information processing apparatuses. Specifically, the game system includes an image pickup section, a display section, a first image generation section for generating a first image by synthesizing an image of a predetermined virtual space as viewed from a first virtual camera with at least a part of a pickup image obtained by the image pickup section, a first image output section for outputting the first image to a predetermined display device, a second image generation section for generating a second image of the virtual space as viewed from a second virtual camera different from the first virtual camera, and a second image output section for outputting the second image to the display section, regardless of whether these sections are provided in one or more devices.

Note that in the case where game processing is shared between information processing apparatuses, the game processing is synchronized between the information processing apparatuses, resulting in complicated game processing. On the other hand, in the case where, as in the above example embodiment, game processing is executed by one game apparatus 3, and the terminal device 7 receives and displays game images (i.e., the terminal device 7 is a thin-client terminal), the game processing is not synchronized between information processing apparatuses, resulting in simplified game processing.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, (a) non-volatile memory, including by way of example semiconductor memory devices, such as Erasable Programmable Read-Only Memory (EPROM), Electrically Erasable Programmable Read-Only Memory (EEPROM), and flash memory devices; (b) magnetic disks such as internal hard disks and removable disks; (c) magneto-optical disks; and (d) Compact Disc Read-Only Memory (CD-ROM). Any of the foregoing may be supplemented by, or incorporated in, specially-designed Application Specific Integrated Circuits (ASICs).

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

The systems, devices and apparatuses described herein may include one or more processors, which may be located in one place or distributed in a variety of places communicating via one or more networks. Such processor (s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor (s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present example embodiment can be applied to, for example, a game system, apparatus, or program for the purpose of, for example, allowing a virtual space displayed on the screen to appear more real.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising:
    a terminal device that includes:
        a camera configured to obtain an image;
        a transceiver configured to transmit the image obtained by the camera; and
        a display device configured to display images; and
    a game apparatus that includes:
        a transceiver configured to receive the image transmitted by the transceiver of the terminal device; and
        a processing system that includes processing circuitry coupled to a memory, the processing system configured to:
            position at least a part of the obtained image that is received by the game apparatus on a predetermined plane that is located within a three-dimensional virtual space;
            locate a first virtual camera in the three-dimensional virtual space so as to view at least the part of the obtained image that is located in the three-dimensional virtual space;
            generate a first image in accordance with the located first virtual camera, the first image including a representation of the part of the obtained image located in the three-dimensional virtual space;
            output the generated first image to a display device that is different from the display device of the terminal device;
            generate a second image of the three-dimensional virtual space as viewed from a second virtual camera different from the first virtual camera, where the first and second virtual cameras are located on opposite sides of, and directed towards, the predetermined plane that includes the part of the obtained image, where the part of the obtained image is viewable from the located first virtual camera but is not viewable from the second virtual camera; and
            transmit, via the transceiver of the game apparatus, the generated second image to the terminal device,
        wherein
            at least the part of the obtained image is rendered on the predetermined plane, thereby generating the first image, and
            in accordance with generation of the second image of the three-dimensional virtual space, the virtual space is changed so that the predetermined plane is not present or is made transparent for generation of the second image.

2. The game system according to claim 1, wherein the at least the part of the obtained image is located at a position of the predetermined plane.

3. The game system according to claim 1, wherein the processing system of the game apparatus is further configured to:
 arrange a rendering plane as the predetermined plane within the three-dimensional virtual space, the predetermined plane having at least the part of the obtained image rendered thereon,
 the generated first image includes the rendering plane.

4. The game system according to claim 3, wherein the first virtual camera is located at a position and an attitude in the three-dimensional virtual space such that the rendering plane is viewed from a side on which the part of the obtained image is rendered.

5. The game system according to claim 3, wherein the second virtual camera is located at a position and an attitude in the three-dimensional virtual space such that the rendering plane is viewed from an opposite side to a side on which the part of the obtained image is rendered.

6. The game system according to claim 3, wherein the processing system of the game apparatus is further configured to execute game processing on the basis of an action of a virtual object arranged in the three-dimensional virtual space and the part of the obtained image rendered on the rendering plane.

7. The game system according to claim 6, further comprising an operating device separate from the terminal device and the game apparatus, the operating device configured to communicate operation data to the game apparatus,
 wherein the processing system of the game apparatus is further configured to control the action of the virtual object in accordance with the communicated operation data.

8. The game system according to claim 1, processing system of the game apparatus is further configured to:
 perform image recognition processing on the obtained image, or a part thereof; and
 perform game control processing to add a change to the three-dimensional virtual space on the basis of the result for the performed image recognition processing.

9. The game system according to claim 1, wherein,
 the terminal device further includes a microphone,
 the transceiver of the terminal device is further configured to transmit data based on sound detected by the microphone to the game apparatus, and
 processing system of the game apparatus is further configured to perform game control processing to add a change to the three-dimensional virtual space on the basis of the sound data.

10. The game system according to claim 1, wherein,
 the transceiver of the terminal device is further configured to transmit operation data, which represents an operation performed by a player using the terminal device, to the game apparatus, and
 the processing system of the game apparatus is further configured to perform game control processing to add a change to the three-dimensional virtual space on the basis of the operation data.

11. The game system according to claim 10, wherein,
 the terminal device further includes a sensor unit that is configured to sense motion of the terminal device and output motion data representing information about the motion of the terminal device,
 wherein the transmitted operation data includes the motion data.

12. The game system according to claim 10, wherein,
 the terminal device further includes a position detector configured to detect an input position on a screen of the display device, and
 the transmitted operation data further includes data based on the detected input position.

13. The game system according to claim 10, wherein,
 the terminal device further includes at least one operation member, and
 the transmitted operation data includes data based on detected actuation of the at least one operation member.

14. An image generation method to be executed in an information processing system including an information processing apparatus, which includes a transceiver and a processing system that includes processing circuitry coupled to a memory device, and a terminal device capable of communicating with the information processing apparatus, the terminal device including a camera configured to acquire a taken image, a transceiver, and a display device, the method comprising:
 receiving, via the transceiver of the information processing apparatus, an image that is based on the taken image obtained by the camera of the terminal device;
 positioning, by using the processing system of the information processing apparatus, at least a part of the obtained image received by the game apparatus in a three-dimensional virtual space;
 locating, by using the processing system of the information processing apparatus, a first virtual camera in the three-dimensional virtual space so as to view at least the part of the obtained image that is located in the three-dimensional virtual space;
 generating, by using the processing system of the information processing apparatus, a first image in accordance with the located first virtual camera, the first image including a representation of the part of the obtained image located in the three-dimensional virtual space;
 outputting the generated first image to a display device that is different from the display device of the terminal device;
 generating a second image of the three-dimensional virtual space as viewed from a second virtual camera different from the first virtual camera, wherein the part of the taken obtained image that is positioned within the three-dimensional virtual space is not viewable in the second image generated via the second virtual camera; and
 transmitting, via the transceiver of the information processing apparatus, the generated second image to the terminal device, wherein
 at least the part of the obtained image is rendered on onto a predetermined plane that is positioned within the three-dimensional virtual space at a position therein, thereby generating the first image, and
 for generation of the second image where the second virtual camera is orientated to view the position at which the predetermined plane is located within the three-dimensional virtual space, the virtual space is changed so that the predetermined plane is not present or is made transparent for generation of the second image.

15. The image generation method according to claim 14, wherein the first and second virtual cameras obtain their respective images of the predetermined plane within the three-dimensional virtual space from opposite sides.

16. The image generation method according to claim 15, wherein at least the part of the obtained image is located at a position of the predetermined plane.

17. The image generation method according to claim 14, further comprising: locating a rendering plane, in the three-dimensional virtual space, on which to render at least the part of the obtained image.

18. The image generation method according to claim 17, wherein the first virtual camera is located at a position and an attitude in the three-dimensional virtual space set such that the rendering plane is viewed from a side on which the part of the obtained image is rendered.

19. The image generation method according to claim 17, wherein the second virtual camera is located at a position and an attitude in the three-dimensional virtual space such that the position of the rendering plane is viewed from an opposite side to a side on which the part of the obtained image is rendered.

20. The image generation method according to claim 17, further comprising: executing, by using the processing system of the information processing apparatus, game processing on the basis of an action of a virtual object arranged in the three-dimensional virtual space and the obtained image rendered on the rendering plane.

21. The image generation method according to claim 20, wherein the information processing system further includes an operating device, which is separate from the information processing apparatus and the terminal device, configured to communicate with the information processing apparatus,
wherein the game processing includes controlling the virtual object in accordance with an operation on the operating device.

22. The image generation method according to claim 14, further comprising:
performing image recognition processing on the obtained image, and
performing game control processing to add a change to the three-dimensional virtual space on the basis of a result from the performed image recognition processing.

23. The image generation method according to claim 14, wherein the terminal device further includes a microphone, the method further comprising:
receiving, via the transceiver of the information processing apparatus, sound data based on the sound detected by the microphone, and
performing game control processing to add a change to the three-dimensional virtual space on the basis of the sound data.

24. The image generation method according to claim 14, further comprising:
receiving, via the transceiver of the information processing apparatus, operation data representing an operation performed by a player on the terminal device;
performing game control processing to add a change to the three-dimensional virtual space on the basis of the operation data.

25. The image generation method according to claim 24, wherein the terminal device further includes a motion sensor configured to output motion data based on sensed motion, the method further comprising:
receiving the motion data.

26. The image generation method according to claim 24, wherein the terminal device further includes a position detection unit capable of detecting an input position on a screen of the display unit, the method further comprising:
receiving data based on the position detected by the position detection unit.

27. The image generation method according to claim 24, wherein the terminal device further includes at least one operation member, the method further comprising:
receiving operation data representing operation on the operation member.

28. A game apparatus comprising:
a transceiver configured to receive an image from another computer apparatus that includes (a) a camera that has obtained the image and (b) a display device;
a processing system that includes at least one processing circuit coupled to a memory and the transceiver, the processing system configured to:
position at least a part of the obtained image that is received by the game apparatus in a three-dimensional virtual space;
locate a first virtual camera in the three-dimensional virtual space so as to view at least the part of the obtained image that is located in the three-dimensional virtual space;
generate a first image in accordance with the located first virtual camera, the first image including a representation of the part of the obtained image located in the three-dimensional virtual space;
output the generated first image to a different display device that is separate from the display device of the another computer apparatus;
generate a second image of the three-dimensional virtual space as viewed from a second virtual camera different from the first virtual camera, where the first and second virtual cameras are located on opposite sides of, the location in the three-dimensional virtual space where the part of the obtained image is located such that the location is viewable by both the first and second virtual cameras, where the representation of the part of the image is included in the first image, but no representation of the part of the image is included in the second image that is generated with the second virtual camera; and
transmit, via the transceiver of the game apparatus, the generated second image to the another computer apparatus for display on the display device thereon, wherein
at least the part of the obtained image is rendered onto a virtual model that is positioned within the three-dimensional virtual space at the location, thereby generating the first image, and
in generating the second image, the virtual model, onto which at least the part of the obtained image is rendered for the first image, is removed from three-dimensional virtual space or set as transparent such that virtual space locations located beyond the location at which the virtual model was located are viewable from the second virtual camera and visually included in the generated second image.

29. A non-transitory computer-readable storage medium having stored therein a game program to be executed by a computer system of a game apparatus, the game apparatus including a transceiver configured to communicate with a terminal device that includes a camera and a display device, the computer system including at least one processing circuit coupled to a memory device, the game program comprising instructions that cause the computer to:
accept, via the transceiver, a pickup image that has been transmitted by the terminal device to the transceiver of the game apparatus, the pickup image being obtained by the camera of the terminal device;

position at least a part of the pickup image that is received by the game apparatus in a three-dimensional virtual space;

locate a first virtual camera in the three-dimensional virtual space so as to view at least the part of the pickup image that is located in the three-dimensional virtual space;

generate a first image in accordance with the located first virtual camera, the generated image being intended to be displayed on a predetermined display device as a first image, the first image including a representation of the part of the pickup image located in the three-dimensional virtual space;

output the generated first image to a display device that is different from the display device of the terminal device;

generate a second image of the three-dimensional virtual space as viewed from a second virtual camera different from the first virtual camera, where the first and second virtual cameras are located on opposing sides of, and directed towards, the position in the three-dimensional virtual space where the part of the pickup image is located, where the part of the pickup image is viewable from the first virtual camera but is not viewable from the second virtual camera; and transmit, via the transceiver, the generated second image to the terminal device for display on the display device, wherein at least the part of the pickup image is rendered on a predetermined plane that is located at the position within the three-dimensional virtual space, thereby generating the first image, and for generation of the second image, the three-dimensional virtual space regarding the predetermined plane is changed so that the predetermined plane is not present or is transparent for generation of the second image.

* * * * *